(12) United States Patent
Charre et al.

(10) Patent No.: US 9,511,400 B2
(45) Date of Patent: Dec. 6, 2016

(54) EQUIPMENT FOR CHANGING CYLINDERS AND/OR CLUSTERS OF A ROLL STAND

(75) Inventors: Francis Charre, Balbiny (FR); Yves Guillot, Trelins (FR); Bernard Rossigneux, Lezigneux (FR)

(73) Assignee: Primetals Technologies France SAS, Savigneux (FR)

( * ) Notice: Subject to any disclaimer, the term of this patent is extended or adjusted under 35 U.S.C. 154(b) by 721 days.

(21) Appl. No.: 13/991,206

(22) PCT Filed: Jan. 12, 2011

(86) PCT No.: PCT/EP2011/050355
§ 371 (c)(1),
(2), (4) Date: Aug. 1, 2013

(87) PCT Pub. No.: WO2012/072274
PCT Pub. Date: Jun. 7, 2012

(65) Prior Publication Data
US 2013/0327112 A1     Dec. 12, 2013

(30) Foreign Application Priority Data
Dec. 2, 2010   (EP) .................................. 10290636

(51) Int. Cl.
| | |
|---|---|
| B21B 31/08 | (2006.01) |
| B21B 31/00 | (2006.01) |
| B23P 19/04 | (2006.01) |
| B21B 31/10 | (2006.01) |

(52) U.S. Cl.
CPC ............ *B21B 31/00* (2013.01); *B21B 31/103* (2013.01); *B21B 31/10* (2013.01); *B23P 19/04* (2013.01); *Y10T 29/53796* (2015.01)

(58) Field of Classification Search
CPC ........ B23P 19/04; Y10T 29/53; B21B 31/10; B21B 31/103; B21B 31/14; B21B 31/12; B21B 31/106
See application file for complete search history.

(56) References Cited

U.S. PATENT DOCUMENTS

| | | |
|---|---|---|
| 3,180,125 A | 4/1965 | O'Brien |
| 3,203,346 A | 8/1965 | Norton et al. |

(Continued)

FOREIGN PATENT DOCUMENTS

| | | | |
|---|---|---|---|
| DE | 19747013 A1 | 4/1999 | |
| GB | 2034222 A * | 6/1980 | ........... B21B 13/001 |

(Continued)

*Primary Examiner* — Jermie Cozart
(74) *Attorney, Agent, or Firm* — Laurence A. Greenberg; Werner H. Stemer; Ralph E. Locher

(57) ABSTRACT

A disassembly apparatus and a method for changing at least one cylinder and/or a cluster of a laterally supported 6-high roll stand. The disassembly apparatus includes: a handling frame, including a positioning and moving device for moving and positioning same; a mobile shuttle capable of moving over the frame, wherein the shuttle includes an extraction device which can be moved by a moving member and which can disassemble the roll stand or assemble a cluster and/or a lateral supporting cylinder on it. The extraction device includes an upper crossbeam rigidly connected, via a movable strut, to a lower crossbeam. Each of the crossbeams have, at each of their ends, a movable gripping plate including at least one locking bolt. The gripping plates of a single crossbeam are configured to grip at least one cluster and/or at least one lateral supporting cylinder by actuating the locking bolt.

9 Claims, 10 Drawing Sheets

(56) References Cited

U.S. PATENT DOCUMENTS 3,813,912 A 6/1974 Matsufuji et al.
5,107,695 A 4/1992 Vandenbroucke
6,053,020 A 4/2000 Tiepelmann et al.
7,104,101 B1 9/2006 Berger et al.

FOREIGN PATENT DOCUMENTS

| JP | S59183912 A | 10/1984 |
| JP | S61206509 A | 9/1986 |
| JP | S62234606 A | 10/1987 |
| KR | 100685041 B1 | 2/2007 |

* cited by examiner

EQUIPMENT FOR CHANGING CYLINDERS AND/OR CLUSTERS OF A ROLL STAND

BACKGROUND OF THE INVENTION

Field of the Invention

The present invention concerns disassembly equipment suitable for changing cylinders and/or clusters of a roll stand in a rolling installation for rolling a metal strip; the disassembly equipment being capable of changing at least one cylinder and/or at least one cluster of the roll stand, and including:
- a handling frame with a positioning and moving device for moving and positioning same along at least one first direction which can be defined in relation to the roll stand; and
- a mobile shuttle capable of moving over the frame along a second direction perpendicular to the first direction.

The invention further concerns a method for changing cylinders and/or clusters of a roll stand.

The present invention relates in particular to the field of metal strip rolling, in particular special steels like stainless steels, using a rolling installation generally including at least one roll stand. More particularly, the present invention concerns disassembly/reassembly equipment for cylinders and/or clusters of a roll stand supported laterally and its operation, said roll stand being intended for rolling any type of metal, including in particular stainless steels. Said roll stand cylinders and clusters will be presented and described in detail in the rest of this document.

Traditionally, a roll stand is equipped with two working cylinders superimposed vertically, each having its longitudinal axis of rotation parallel to the plane of travel of the metal strip and placed in a single gripping plane perceptibly perpendicular to the direction of travel of the strip between said working cylinders. The strip to be rolled is intended to pass between the two working cylinders in a continuous manner, i.e. always traveling in a single direction, or reversibly, i.e. traveling alternately in one direction and then the other.

During rolling, the working cylinders are generally pressed against one another by a pair of supporting cylinders each having its longitudinal axis in said same gripping plane (or close to said gripping plane) and between which a rolling pressure—or force—is applied. In one particular roll stand configuration, usually going under the name of "sexto" or "6-High", an intermediate cylinder is interposed between the working cylinder and the supporting cylinder situated on the same side of the strip to be rolled. The roll stand is then formed from six cylinders superimposed vertically one on top of the other: a pair of working cylinders gripping the strip to be rolled, respectively an upper working cylinder situated above the plane of travel of the strip and a lower working cylinder situated below the plane of travel of the strip, gripped by a first pair of cylinders formed by the intermediate cylinders, respectively an upper intermediate cylinder situated above the plane of travel of the strip and a lower intermediate cylinder situated below the plane of travel of the strip, themselves finally gripped by a second pair of cylinders formed by the supporting cylinders, respectively an upper supporting cylinder situated above the plane of travel of the strip and a lower supporting cylinder situated below the plane of travel of the strip.

Finally, a roll stand in a rolling mill of the 6-high type can be described as being "supported laterally" when it comprises lateral supporting members for the working cylinders. These lateral supporting members for the working cylinders serve to take up the flexion forces produced by rotational drive of each working cylinder by friction by the intermediate cylinder in contact with it. In fact, the working cylinders, with small diameters, are subjected to great tangential forces on the part of the intermediate cylinders when being rotationally driven by friction, and these forces, not being able to be absorbed without excessive flexion by the working cylinders alone, must be taken up by their respective lateral supporting members, which thus make it possible to limit deformation by flexion of said working cylinders. Thus, each of the working cylinders is in particular in contact, laterally, on each side of the gripping plane, with at least one lateral supporting member, including for example a lateral supporting cylinder itself supported laterally, by contact, by two rows of lateral supporting rollers assembled side by side.

In a known way, the lateral supporting members are arranged either on a single side of the gripping plane, in particular on the side where the strip enters the roll stand, or on both sides of the gripping plane, i.e. on the side where the strip enters the roll stand and the side where the strip emerges from the roll stand. Thus, the 6-high configuration is characterized on the one hand by one or respectively two upper lateral supporting members laterally supporting a single side, or respectively both lateral sides of the upper working cylinder, and on the other hand, one, or respectively two lower lateral supporting members laterally supporting a single side, or respectively both lateral sides of the lower working cylinder. In particular, each upper lateral supporting member includes at least one upper lateral supporting cylinder capable of laterally supporting the upper working cylinder, itself supported by two rows of upper supporting rollers capable of laterally supporting the upper lateral supporting cylinder, and each lower lateral supporting member includes at least one lower lateral supporting cylinder capable of laterally supporting the lower working cylinder, itself supported by two rows of lower supporting rollers capable of laterally supporting the lower lateral supporting cylinder.

Each lateral supporting cylinder, respectively upper or lower, and its rows of supporting rollers, respectively upper or lower, are assembled on a beam transverse to the roll stand, respectively an upper or lower transverse beam, and constitute with said transverse beam a "cluster", respectively an upper or lower cluster. Each cluster is assembled on a supporting arm capable of supporting it and moving by rotating and/or sliding with respect to a constituent part of the roll stand, for example, with respect to chocks of the intermediate cylinders, or even with respect to the roll stand itself or with respect to chocks of the supporting cylinders. In particular, a recent development of this type of 6-high roll stand implemented by the Applicant has shown that each of the supporting arms of the lateral supporting members has the advantage of being carried by at least one intermediate member supported by the roll stand, said intermediate member being capable of supporting the chocks of the intermediate cylinders, while being movable with respect to said roll stand, in this case camber units intended to bend the intermediate cylinder and capable of being moved vertically with respect to the roll stand.

Whatever the configuration of the seating of the lateral supporting members, i.e. seating the lateral supporting members by means of the chocks of the intermediate cylinders, or by means of the chocks of the supporting cylinders, or by means of the stand itself, or by means of the intermediate member, one of the difficulties to be resolved by a person skilled in the art is to provide the rolling installation with devices providing for the efficient disassembly and reassembly of the cylinders and clusters of the roll stand, i.e. in particular of the working cylinders, intermediate cylinders, lateral supporting members, lateral supporting cylinders, and supporting cylinders, so as to be able to proceed to inspection, repair or replacement of said cylinders and/or clusters or other elements of the roll stand which are inaccessible when said cylinders and/or clusters are assembled in said cage.

This is how the Applicant's patent EP 0 908 246 describes a device for changing intermediate and/or working cylinders of a roll stand of the 6-high type, the lateral supporting members of which pivot about axes of pivot rigidly connected to the chocks of the intermediate cylinders. This document describes enhancements to the state of the art applied to this type of rolling mill, and in particular the way in which to extract from the roll stand the working cylinders only, and/or the intermediate cylinders with their lateral supporting members to which they are rigidly connected. The methods and devices described unfortunately do not allow the lateral supporting members to be disassembled separately from the intermediate cylinders. In fact, the assembly formed by the intermediate cylinders and the lateral supporting members must first be extracted from the roll stand before being disassembled, requiring on the one hand an additional step of disassembly out of said roll stand before being able to replace, repair or inspect the intermediate cylinders and/or the lateral supporting members, and on the other hand, special handling tools capable of preventing any untimely and dangerous movement of the lateral supporting members, in particular during a reversal of said assembly. Furthermore, the devices for changing intermediate cylinders based on the disassembly and reassembly of said assembly imply the maintaining of a large stock of parts including not only lateral supporting members disconnected from the intermediate cylinder, but also complete assemblies ready to replace a defective assembly, in order to provide for rotation of said assemblies with no loss of time associated with the disassembly of said defective assembly.

In another constructional arrangement described in particular in the Applicant's WO 01/21334 or WO 2004/041456, and characterized by seating of the lateral supporting members by means of the roll stand itself, said clusters of the 6-high roll stand supported laterally are able to slide in guides rigidly connected to the roll stand in a direction parallel to the longitudinal axis of the cylinders, along the cluster supporting arms. According to this other constructional arrangement, the intermediate cylinders can be easily extracted from the roll stand and maintained in a traditional manner, without special tools or any need to disassemble their chocks. However, it also has disadvantages from the point of view of the kinematics of the roll stand. In fact, the disassembly of the intermediate cylinders in this other constructional arrangement is subject to a risk of interference between the working cylinder and the two lateral supporting cylinders of the lateral supporting members during opening of the roll stand as required to extract said intermediate cylinders and consecutive vertical movement of the working cylinders.

In fact, the general arrangement of the working and lateral supporting cylinders means that, in operating position, the axes of rotation of the upper lateral supporting cylinders are situated above the axis of rotation of the upper working cylinder and that the distance between the two lateral supporting cylinders, when they are in contact with the working cylinder, does not allow for passage of the working cylinder upwards, i.e. in the direction of the upper supporting cylinder. Any vertical movement upwards of the upper working cylinder may thus be hindered by the presence of the two upper lateral supporting cylinders which do not accompany the vertical movement of the upper working cylinder. Or, on the other hand, said vertical movement may take place with lateral supporting cylinders too far apart, not providing for lateral stability of the working cylinder. The situation is the reverse for the lower working and lateral supporting cylinders, i.e. situated below the plane of travel of the strip in the grip of the working cylinders.

Before any vertical movement of the working cylinders, it is therefore necessary that the two lateral supporting cylinders have been safely moved away from the working cylinder by a distance sufficient not to hinder a vertical movement of the working cylinder, while guaranteeing lateral stability of said working cylinder. The implementation of this separation, generally performed by an operator, increases on the one hand the time needed to disassemble the cylinders from the roll stand, and is not always reliable.

A second disadvantage associated with the disassembly of the intermediate cylinder in said other roll stand arrangement lies in interference between the working cylinder and the two lateral supporting cylinders of the lateral supporting members during closure of the roll stand and consecutive vertical movement of the working cylinders. This interference between the working cylinder and the lateral supporting cylinders may originate, for example, in poor positioning of the lateral supporting cylinders during maintenance of the roll stand by an operator (position of the lateral supporting cylinders too close with respect to the position of the working cylinder) or in the installation of a new working cylinder with a diameter greater than the diameter of the working cylinder which has been replaced, or even in a malfunction of the roll stand or in an error in the positioning of the different cylinders. In all cases, there will be interference between the working cylinder and the lateral supporting cylinders during closure of the roll stand, which will require a new disassembly in order to inspect, rectify or replace, the cylinders having interfered with one another.

Finally, the seating of the lateral supporting members by means of an intermediate member between the roll stand and the chocks of its intermediate cylinders, in this case by means of camber units of the intermediate cylinders, makes it possible to resolve most of the problems posed by changing cylinders or clusters of a roll stand the lateral supporting members of which pivot about axes of pivot rigidly connected to the chocks of the intermediate cylinders, or of a roll stand with lateral supporting members sliding in guides rigidly connected to the roll stand itself. Unfortunately, this type of roll stand characterized by seating of the lateral supporting members by means of an intermediate member requires specific devices for disassembling the cylinders and clusters which are, for the present, non-existent or unsuitable.

BRIEF SUMMARY OF THE INVENTION

The object of the present invention is to define at least one device and one method for changing cylinders and/or clusters of a roll stand suitable for changing cylinders and/or clusters of a roll stand of the 6-high type with lateral supporting members supported by said intermediate member, and in particular pivoting about axes of pivot rigidly connected to camber units of the intermediate cylinders. Another object of the present invention is to propose an installation for changing cylinders and/or clusters, which is on the one hand as efficient as possible, in particular by minimizing the down time of the roll stand during a period of time needed to change said cylinders and/or clusters, and which, on the other hand, provides great flexibility of use by allowing for in particular a targeted or selective change of each of the different cylinders and/or clusters, and a reduction in the risks of deterioration of the cylinders and/or clusters relative to said changes.

To this end, disassembly equipment for cylinders and/or clusters of said roll stand, and a method for changing said cylinders and/or clusters are proposed by the content of the independent claims. A set of sub-claims also presents advantages of the invention.

A first object of the present invention is thus disassembly equipment suitable for changing cylinders and/or clusters of a roll stand intended for rolling a metal strip, said disassembly equipment being capable of changing at least one cylinder and/or at least one cluster of said roll stand, in particular intended for changing at least one lateral supporting cylinder and/or at least one cluster, and including:

- a handling frame including positioning and moving means for moving and positioning same along at least one first direction which can be defined in relation to said roll stand. In particular, said frame is capable of moving on rails, in particular rectilinear, which can be arranged on one side of said roll stand, in particular on the operator side of the rolling installation, parallel to the longitudinal axis of rotation of the working cylinders of said roll stand, or in other words, perpendicular to a direction of travel of the strip. Advantageously, when the frame is arranged, during use of the disassembly equipment, alongside the roll stand, in particular assembled on said rails, said first direction is parallel to the longitudinal axis of rotation of the working cylinders when they are assembled in the roll stand. In all cases, said first direction allows freedom of movement of said frame capable of allowing for change of said cylinders and/or clusters, for example by moving said frame closer to or further away from the roll stand. Changing cylinders and/or clusters is taken to mean the replacement of at least one cylinder and/or at least one cluster, said cylinder in particular being able to be a working cylinder, an intermediate cylinder or a lateral supporting cylinder. The replacement of a cylinder and/or a cluster includes on the one hand the disassembly of said cylinder and/or said cluster, but also on the other hand the assembly of the same cylinder and/or the same cluster or a different cylinder and/or a different cluster, as described in the method for changing a cylinder and/or a cluster of a roll stand presented in the rest of this document;
- a mobile shuttle capable of moving over said frame along at least a second direction perpendicular to said first direction;

characterized in that said shuttle includes an extraction device capable of disassembling the roll stand or of assembling said cluster and/or said cylinder, in particular a lateral supporting cylinder, on it, said extraction device including:

- an upper crossbeam rigidly connected, via a movable strut, to a lower crossbeam arranged below said upper crossbeam, each of said crossbeams including, at each of the ends thereof, a gripping plate, in particular movable, including at least one locking bolt, said gripping plates of a single crossbeam, i.e. the two gripping plates of the upper crossbeam and respectively the two gripping plates of the lower crossbeam, being intended to grip at least one cluster and/or at least one lateral supporting cylinder by actuating said locking bolt. In particular, the two plates equipping the upper crossbeam are capable of being rigidly connected/disconnected by actuating locking bolts to or from an upper lateral supporting cylinder or an upper cluster or two upper lateral supporting cylinders or two upper clusters or an upper lateral supporting cylinder and an upper cluster. Similarly, the two plates equipping the lower crossbeam are capable of being rigidly connected/disconnected by actuating locking bolts to or from a lower lateral supporting cylinder or a lower cluster or two lower lateral supporting cylinders or two lower clusters or a lower lateral supporting cylinder and a lower cluster;
- a moving member of said extraction device capable of moving said extraction device along said first direction by acting on said strut rigidly connected to said upper and lower crossbeams.

In particular, the extraction device is capable of assembling in the roll stand, or disassembling from the roll stand, a separate cluster of an intermediate cylinder or a working cylinder, or a separate lateral supporting cylinder from its rows of rollers or from an intermediate cylinder or from a working cylinder. In other words, the extraction device according to the invention is capable of extracting or assembling a cluster and/or a lateral supporting cylinder, said cluster being free from any rigid connection with a working or intermediate cylinder, and said lateral supporting cylinder being free from any rigid connection with a working cylinder, or with an intermediate cylinder, or with its rows of supporting rollers. According to the present invention, the step to assemble or disassemble a cluster and/or a lateral supporting cylinder is separate, or in other words "independent", from a step to assemble or disassemble a working cylinder or an intermediate cylinder, since the extraction device is capable of accepting a cluster and/or a lateral supporting cylinder separately from the working cylinder or the intermediate cylinder or rows of supporting rollers of the lateral supporting cylinder. Thus, the assembly and disassembly of the intermediate cylinder, as well as the disassembly and assembly of the working cylinder, are independent of disassembly and assembly of a cluster or a lateral supporting cylinder, and the disassembly and assembly of the lateral supporting cylinder can be independent of disassembly and assembly of the cluster to which it belongs.

A second object of the present invention is thus a method for changing cylinders and/or clusters of a 6-high roll stand supported laterally including a pair of working cylinders gripped by a pair of intermediate cylinders, themselves gripped by a pair of supporting cylinders, each of said working cylinders being supported laterally by a lateral supporting member including a lateral supporting cylinder supported by supporting rollers, said lateral supporting cylinder and its rollers being assembled on a transverse beam in order to form a cluster carried by supporting arms, said method for changing cylinders and/or clusters being characterized in that it includes, in particular chronologically, the following steps:

a) during disassembly:
- a first pivoting of the supporting arms of at least one cluster, in particular of the upper clusters and/or the lower clusters, so as to release a passage for an extraction device capable of disassembling at least one lateral supporting cylinder and/or at least one cluster of the roll stand, said extraction device forming part of disassembly equipment suitable for changing cylinders and/or clusters of said roll stand;

disassembly of the working cylinders and intermediate cylinders of the roll stand, in particular disassembly of the upper and lower working and intermediate cylinders;

positioning of said extraction device in an extension of said passage;

possible vertical movement of two gripping plates arranged respectively at one end of a crossbeam of said extraction device and at the other end of the same crossbeam, so as to put said gripping plates in a vertical position providing for a horizontal movement of said plates free from interference with other elements of the roll stand during a horizontal movement of said gripping plates inside said roll stand, for example from a parking position outside the roll stand toward a gripping position inside said roll stand. In particular, a first pair of gripping plates assembled at the ends of an upper crossbeam, and a second pair of gripping plates assembled at the ends of a lower crossbeam, i.e. situated below said upper crossbeam, can be moved vertically in order to position them at least vertically so as to allow a horizontal movement of said gripping plates from outside the roll stand toward the inside of said roll stand without interfering with other parts or elements of the roll stand;

a movement, in particular horizontal, of said extraction device along a first direction, between the parking position away from the roll stand and the gripping position for the clusters and/or cylinders, said gripping position providing for an insertion of the cluster between said two plates of a single crossbeam by pivoting the supporting arms of said cluster, and said first direction being in particular parallel to the axis of rotation of the working cylinders when they are assembled in the roll stand;

a second pivoting of the supporting arms of the cluster capable of positioning said cluster between said gripping plates;

an additional vertical movement of the plates intended to position said plates of a single crossbeam with respect to at least one cluster and/or at least one lateral supporting cylinder in order to allow rigid connection of each plate with at least said cluster and/or at least said lateral supporting cylinder;

said rigid connection of at least one cluster and/or at least one lateral supporting cylinder to said gripping plates by actuating at least one locking bolt of each of said gripping plates of a single crossbeam, said locking bolt being capable of rigidly connecting said cluster and/or said lateral supporting cylinder to said plate;

for each cluster rigidly connected to said gripping plates, disconnection of said cluster from its supporting arms by unlocking a clamping system of the cluster, and for each lateral supporting cylinder rigidly connected to said gripping plates, disconnection of said lateral supporting cylinder from its cluster by unlocking a locking system of said lateral supporting cylinder;

pivoting of the supporting arms of said cluster in a position away from the extraction device in order to release a free passage for it;

possible vertical movement of said gripping plates rigidly connected to said clusters and/or lateral supporting cylinders in order to allow a horizontal movement of the extraction device outside the roll stand free from interference with other elements or parts of the roll stand;

a movement of the extraction device loaded with at least one cluster and/or at least one lateral supporting cylinder outside the roll stand to said parking position;

placing each cluster carried by the extraction device and/or each lateral supporting cylinder carried by said extraction device on a holding bracket, said placing being implemented by vertical movement of said gripping plates in the direction of said bracket and release of each lateral supporting cylinder and each cluster by unlocking at least one locking bolt of each gripping plate;

b) during assembly:

acceptance by the extraction device of at least one cluster and/or at least one lateral supporting cylinder, on the one hand by vertical movement of at least one gripping plate in the direction of a loading bracket intended to support each cluster and each lateral supporting cylinder intended to be accepted by said extraction device, and on the other hand, for each cluster and each lateral supporting cylinder intended to be accepted, locking or rigid connection of them to said plate by means of at least one locking bolt of said gripping plate in order to allow rigid connection of them to said gripping plate, a lateral supporting cylinder and a cluster being able, prior to said acceptance, to be placed on a single loading bracket or on a different loading bracket of a bracket carriage;

vertical movement of the gripping plates rigidly connected to at least one cluster and/or at least one lateral supporting cylinder, followed by a horizontal movement of the extraction device, along said first direction, from an intermediate loading position to said gripping position, said intermediate loading position being situated between said parking position and said gripping position;

pivoting of each of the supporting arms intended to support a single cluster from a position away from the extraction device to a position situated between said gripping plates and providing for acceptance of a cluster or a lateral supporting cylinder by said supporting arms intended to support the same cluster;

rigid connection of each cluster to its supporting arms by locking the clamping system, or rigid connection of each lateral supporting cylinder to said cluster by locking the locking system;

rigid connection of each cluster and each lateral supporting cylinder of said gripping plates by retracting at least one locking bolt of said gripping plates;

pivoting the supporting arms in a position away from said extraction device in order to release a passage for movement of said extraction device outside the roll stand;

a movement of the extraction device outside the roll stand.

The present invention thus concerns changing cylinders, for example the working cylinder, the intermediate cylinder, the lateral supporting cylinder, and/or clusters of a roll stand for a strip to be rolled by means of the disassembly equipment according to the present invention for which said roll stand is suitable. In particular, it describes disassembly equipment capable of changing cylinders and/or clusters of a 6-high roll stand supported laterally having a special configuration, including on the one hand traditionally:

two working cylinders capable of gripping said strip to be rolled, more precisely, an upper working cylinder situated above a plane of travel of the strip to be rolled, and a lower working cylinder situated below said plane of travel of the strip to be rolled, the upper and lower working cylinders having their longitudinal axes of rotation in a gripping plane perceptibly perpendicular to the plane of travel of the strip to be rolled, two intermediate cylinders, respectively an upper intermediate cylinder capable of being in contact with the upper working cylinder and a lower intermediate cylinder capable of being in contact with the lower working cylinder, two supporting cylinders, respectively an upper supporting cylinder capable of being in contact with the upper intermediate cylinder, and a lower supporting cylinder capable of being in contact with the lower intermediate cylinder, the upper and lower supporting cylinders being capable of transmitting a gripping force to the working cylinders by means of the intermediate cylinders, at least one lateral supporting member capable of laterally supporting one of said working cylinders, in particular a first and a second upper lateral supporting member, respectively situated on each side of said gripping plane and capable of laterally supporting said upper working cylinder, and a first and a second lower lateral supporting member lower, situated on each side of said gripping plane and capable of laterally supporting the lower working cylinder, and being characterized, on the other hand specially, in that the chocks of an intermediate cylinder include a means of movement capable of providing for the movement of said chocks over a sliding or rolling surface of a camber unit or a lateral supporting member, for example on a rail assembled either on at least one camber unit intended to bend said intermediate cylinders, or on at least one lateral supporting member. In particular, each of the supporting arms of each upper cluster of the upper lateral supporting members is capable of including the sliding or rolling surface, capable of cooperating with castors or slide runners which are able to equip lugs of the upper chocks. Thus, during disassembly, and respectively assembly, of at least one cylinder by means of the disassembly equipment according to the invention, an axial movement of the chocks by sliding or rolling said runners or said castors over said rolling or sliding surfaces provides, if necessary, for extraction of the upper intermediate cylinder from the gripping position in the roll stand to the parking position on the shuttle, and respectively assembly thereof by moving its chocks on rails arranged in the shuttle and extendable by said rails equipping the camber units or the lateral supporting members, from the parking position in the shuttle to the gripping position in the roll stand. Similarly, each supporting arm of each lower cluster of the lower lateral supporting members is capable of including a sliding or rolling surface allowing the lower chocks to move axially by sliding or rolling by means respectively of slide runners or castors which are able to equip surfaces of said lower chocks, said slide runners or castors being intended to cooperate with the sliding or rolling surfaces to allow, during disassembly, extraction of the lower intermediate cylinder and its lower chocks outside the roll stand, from the gripping position to the parking position, and vice versa during assembly of it.

Thus, the disassembly equipment according to the invention is in particular capable of changing at least one lateral supporting cylinder and/or at least one cluster of said lateral supporting members of such a roll stand with camber units which are movable vertically and serve to support the lateral supporting members. For this purpose, the present invention describes a set of devices for disassembling cylinders and clusters providing for the change of at least one lateral supporting cylinder and/or at least one cluster of such a roll stand with said special configuration, free from simultaneous disassembly of the lateral supporting cylinder or said cluster and an intermediate cylinder or a working cylinder, which advantageously makes it possible to dispense with at least one additional disassembly step having to be performed outside the roll stand, such as for example disassembly of a rigid connection of a cluster to the chocks of an intermediate cylinder, which would require other disassembly devices and give rise to a loss of time associated with said additional disassembly.

In order to permit efficient disassembly of the lateral supporting cylinders and/or clusters, the disassembly equipment according to the invention is in particular characterized in that the extraction device includes a device to move the gripping plate capable of moving at least vertically at least one of said gripping plates. For example, at least one motor rigidly connected to the crossbeam at the end of which said gripping plate is assembled makes it possible to control the vertical movement, i.e. perpendicular to a longitudinal axis of the crossbeam, of one or two gripping plates equipping said crossbeam. Advantageously, each gripping plate of the disassembly equipment according to the invention is thus movable vertically by such a gripping plate movement device making it possible to position each plate in an advanced position, said advanced position being intended to allow a horizontal, or advance, movement of the extraction device fitted with its gripping plates, in the direction of the interior of the roll stand, and in a way free from any interaction with the roll stand, in particular with the camber units of the intermediate cylinders, and allowing in particular a continuous rectilinear movement of the extraction device from the parking position to the gripping position.

In the gripping position, the extraction device is able to be positioned, in particular automatically, in a position centered with respect to the roll stand in such a way as to allow each lateral supporting member, in particular each cluster, to pivot from a position away from the extraction device to a position close to said extraction device until the cluster is inserted between two gripping plates equipping a single crossbeam. According to a first embodiment of the invention, during a change of clusters and/or lateral supporting cylinders, all the clusters of the roll stand are positioned in a close position and inserted between the gripping plates of the upper and lower crossbeams, and only the locking bolts capable of locking and rigidly connecting to said plates the clusters intended to be changed and the clusters including a lateral supporting cylinder intended to be changed are actuated in order to connect them rigidly to said plates, such that the clusters and lateral supporting cylinders not to be changed remain rigidly connected to said plates. According to a second embodiment, only the clusters intended to be changed and the clusters including a lateral supporting cylinder intended to be changed are inserted between said plates so as to be rigidly connected by locking by means of said locking bolts.

Advantageously, the disassembly equipment according to the invention is also characterized in particular in that each gripping plate includes two lateral supporting cylinder locking bolts and two cluster locking bolts, intended respectively for locking/unlocking at least one lateral supporting cylinder, in particular two lateral supporting cylinders, and for locking/unlocking at least one cluster, in particular two clusters. Thus, a pair of gripping plates equipping one of said crossbeams can be rigidly connected, by means of said cluster and/or lateral supporting cylinder locking bolts, to one or two clusters, or to one or two lateral supporting cylinders, or to a cluster and a lateral supporting cylinder. Thus, the upper (respectively lower) crossbeam, will be capable, via its gripping plates capable of being rigidly connected to at least one cluster and/or at least one lateral supporting cylinder, of accepting at least one upper (respectively lower) cluster, or at least one upper (respectively lower) lateral supporting cylinder, or a lateral supporting cylinder and an upper (respectively lower) cluster.

The pivoting of the supporting arms of each cluster makes it possible to bring the cluster supported by said supporting arm into a position close to the extraction device, between the gripping plates of the upper crossbeam if it is an upper cluster, or between the gripping plates of the lower crossbeam if it is a lower cluster. Once the cluster is in said close position, it can be accepted by the gripping plates of the upper crossbeam if it is the upper cluster, or lower if it is the lower cluster. Said acceptance includes rigid connection to said gripping plates, either of the lateral supporting cylinder of said cluster by means of lateral supporting cylinder locking bolts if the lateral supporting cylinder is to be changed, or of said cluster by means of cluster locking bolts if the cluster is to be changed.

Advantageously, the disassembly equipment according to the invention is characterized in that at least one of said lateral supporting cylinder locking bolts is capable of actuating a locking system of said lateral supporting cylinder providing for the rigid connection of said lateral supporting cylinder to said cluster. Thus, the locking bolt of the lateral supporting cylinder and the locking system of said lateral supporting cylinder are capable of cooperating with one another in order to provide for locking, respectively unlocking, the lateral supporting cylinder with the gripping plate to which the bolt belongs, in order rigidly to connect, respectively disconnect, said plate to or from said lateral supporting cylinder. In order to provide for such cooperation and complementarity of the lateral supporting cylinder locking bolt and said locking system, the present invention proposes a locking system of said lateral supporting cylinder of a roll stand suitable for the disassembly equipment according to the present invention. In fact, the locking system according to the invention is in particular characterized in that it includes an axis locking device, said axis locking device being arranged in one end of the axis of rotation of said lateral supporting cylinder, in particular at each end of said axis of rotation, said axis locking device being capable of being held on the one hand in a position locked by an elastic unit, and on the other hand in an unlocked position through the action of said lateral supporting cylinder locking bolt on said axis locking device, said action of said lateral supporting cylinder locking bolt being capable of counterbalancing an action of said elastic unit.

Thus, the present invention defines a locking system of a lateral supporting cylinder capable of cooperating with the gripping plate locking bolt. In particular, a lateral supporting cylinder can be equipped, at each of its ends, by said locking system, each of the axis locking devices of each of the locking systems of said lateral supporting cylinder then being simultaneously able to be actuated, in particular automatically, by said lateral supporting cylinder locking bolt of each of the gripping plates intended for said gripping of said lateral supporting cylinder. In particular, the axis locking device includes a surface intended to be contacted by one end of the lateral supporting cylinder locking bolt and its geometry is complementary to the geometry of said end. This may be for example a notch in the axis locking device into which said end of the lateral supporting cylinder locking bolt can be inserted. Said lateral supporting cylinder locking bolt is in particular capable of exerting pressure on said axis locking device in order that the latter, by compression of said elastic unit, passes from the locked position to the unlocked position. Conversely, release of the pressure exerted by the lateral supporting cylinder locking bolt on the axis locking device provides for release of said elastic unit capable of giving rise to a movement of said axis locking device from its unlocked position to its locked position. In its locked position, the axis locking device is capable of rigidly connecting the lateral supporting cylinder to its cluster, while, in its unlocked position, said axis locking device on the one hand releases the lateral supporting cylinder from its cluster, and simultaneously rigidly connects the lateral supporting cylinder to the gripping plates intended to accept it. Thus, the lateral supporting cylinder locking bolt equipping each of the two gripping plates intended to accept said lateral supporting cylinder is in particular capable, by actuating said axis locking device of the locking system, of equipping each of the ends of said lateral supporting cylinder, of simultaneously disconnecting said lateral supporting cylinder from its cluster and rigidly connecting it to said gripping plates in one single action, and vice versa. Advantageously, once said lateral supporting cylinder has been disconnected from its cluster and rigidly connected to the gripping plates, or conversely, disconnected from the gripping plates and rigidly connected to the cluster, pressure units providing for the pre-loading of the lateral supporting cylinder on its rows of supporting rollers are released, conversely actuated, and the supporting arms pivot in order to free a passage outside the roll stand for said extraction device.

Also, at least one of said cluster locking bolts is capable of actuating, in particular automatically, during locking, respectively unlocking, of said cluster, at least one clamping system of said cluster capable of rigidly connecting said cluster to its supporting arms, respectively disconnecting it from them. Preferentially, each of the clamping systems of each of the supporting arms of a single cluster can be actuated by one single cluster locking bolt, such that a single cluster locking bolt is capable of controlling or actuating all of the clamping systems of the cluster intended to lock it, respectively unlock it. Preferentially, each of said cluster locking bolts is in particular capable of locking with one end of the transverse beam of the cluster intended to be changed. Thus, the transverse beam of said cluster includes, at each of its ends, at least one cavity intended to cooperate with said cluster locking bolt in order to provide for the rigid connection of said cluster to the gripping plate carrying said cluster locking bolt. For example, said cavity and said cluster locking bolt have complementary geometric shapes so that said cluster locking bolt can be inserted into said cavity, or said cavity includes for example a trigger with one end projecting outside said cavity, said end being intended to cooperate with a cradle described later in the present document. In particular, said transverse beam includes two cavities, respectively one cavity at one end of the transverse beam and another cavity at the other end of the transverse beam, said ends making reference to the longitudinal ends of said transverse beam. Each of these cavities is for example intended to accept, therein, a cluster locking bolt, respectively, one of the two cluster locking bolts of the gripping plate equipping one end of the crossbeam (upper, lower) and the other of the two cluster locking bolts of the other gripping plate equipping the other end of the same crossbeam.

Preferentially, at least one of said cavities also includes a mechanical, or electrical or electromechanical, control system capable on the one hand of actuating, in particular automatically, said clamping system during interaction of said control system with the cluster locking bolt, in particular when the latter penetrates into said cavity or presses said trigger, and on the other hand, capable of actuating, in particular automatically, at least one cluster locking bolt so as to disconnect said cluster from its gripping plate once the clamping system is rigidly connected to the cluster. In particular, a single cavity among said cavities of the crossbeam can be equipped with such a control system. Advantageously, the latter is in particular also capable of actuating each of said clamping systems of a single cluster simultaneously. In this way, only the cluster locking bolt intended to cooperate with the sole cavity including said control system will be capable of actuating all of the clamping systems of the cluster, i.e. each of the two clamping systems equipping respectively each one of the two supporting arms of said cluster. Also, at least one of said clamping systems of the cluster is in particular capable of actuating said control system, for example by sending an electrical signal or by electromechanical coupling, or by mechanical coupling, during rigid connection of the clamping system to the cluster, so that the control system actuates at least one cluster locking bolt so as to unlock said cluster, preferentially all the cluster locking bolts intended to lock/unlock said cluster.

In particular, said clamping system of the cluster of a roll stand suitable for the disassembly equipment and intended to cooperate with said cluster locking bolt is characterized in that it includes a jack rigidly connected to a supporting arm of a cluster capable of rigidly connecting or disconnecting said cluster to or from its supporting arm during the actuation of said clamping system by the cluster locking bolt, via in particular said control system. Said jack preferably includes a moving rod. In particular, said control system, which can be actuated by said cluster locking bolt, is capable of controlling said jack. Conversely, a position of said moving rod of said jack is in particular capable of actuating, automatically, said control system, so that the latter controls the unlocking of at least one cluster locking bolt, or in particular, of all the locking bolts of said cluster. According to a first preferential embodiment of said clamping system, said moving rod of said jack includes a T-shaped end intended to lock said transverse beam though the insertion of said T-shaped end into a locking space of the transverse beam of the cluster, said locking space including a locking groove on the edges of which said T-shaped end is capable of resting, and a hollow capable of allowing said T-shaped end to pass outside the locking space. According to a second preferential embodiment of said clamping system, the moving rod of said jack includes a wedge-shaped end intended to lock said transverse beam through the insertion of said wedge-shaped end into a slot of a locking part rigidly connected to the transverse beam of the cluster.

Advantageously, the cluster can thus be rigidly connected to its supporting arms while being simultaneously disconnected from the gripping plates supporting it, or conversely, simultaneously disconnected from its supporting arms and rigidly connected to the gripping plates intended to accept it, in one and the same step, in particular completely automatic, or at least partially automatable. In fact, the penetration into said cavity of at least one of said two cluster locking bolts intended to rigidly connect/disconnect the cluster to or from its gripping plates is capable of actuating said control system which, in its turn, is capable of controlling in real time at least one of said jacks in order that at least one of said clamping systems of the cluster disconnects said transverse beam of the cluster from its supporting arms. Conversely, the rigid connection of the cluster to its supporting arms by means of the clamping system is capable of actuating said control system which, in its turn, is capable of controlling in real time at least one of said cluster locking bolts, in order that at least one of said cluster locking bolts unlocks, or in other words, releases said transverse beam supporting said cluster from its gripping plates.

Clearly, manual remote control of the clamping system, the control system, and the locking system is in particular possible from a control point remote from the rolling installation, or from a control point of the disassembly equipment according to the invention. Once the cluster is rigidly connected to the gripping plates and disconnected from its supporting arms, respectively disconnected from the gripping plates and rigidly connected to its supporting arms, the latter pivot in a separated position in order to free a passage outside the roll stand for the extraction device.

While the second preferential embodiment of said clamping system makes it possible to release the cluster by retracting said jack of the locking part rigidly connected to the transverse beam, or to connect it rigidly through the insertion of said jack into the locking part rigidly connected to the transverse beam, the first preferential embodiment of said clamping system requires a first horizontal movement of the cluster so as to position the T-shaped end of said jack in the hollow of the locking groove in order to disconnect said cluster from its supporting arms, and respectively a second horizontal movement, opposite to said first movement, in order to move said T-shaped end from a position in said hollow to a position in the locking groove where the T-shape of the end of said jack will be capable of gripping the edges of said groove, and thus the transverse beam, against the supporting arms of the cluster, during the rigid connection of said cluster to its supporting arms. Advantageously, said first horizontal movement and said second horizontal movement can be performed by said extraction device, for example by being implemented by said moving member capable of simultaneously moving the upper crossbeam and the lower crossbeam.

The disassembly equipment according to the invention is also in particular characterized in that it includes at least one moving cluster gripping cradle. In fact, at least one gripping plate of a crossbeam according to the invention is capable of cooperating with a moving cluster gripping cradle, which can be positioned between said plate and the other plate equipping the same crossbeam, said cradle including at least one supporting member providing for support of said cradle by said gripping plate. Each moving cradle is in particular capable of cooperating with one of said gripping plates so as to guarantee in particular the locking/unlocking of clusters or lateral supporting cylinders by means of locking bolts of said plates. Advantageously, two moving cradles, i.e. a first moving cradle cooperating with the gripping plate situated at one end of the upper, respectively lower crossbeam and a second moving cradle cooperating with the gripping plate situated at the other end of said upper, respectively lower crossbeam are in particular rigidly connected to one another by a supporting beam, so as to form an upside down U gripped by the gripping plates of the upper crossbeam and said upper crossbeam, and respectively an upright U gripped by the gripping plates of the lower crossbeam and said lower crossbeam. Thus, said two moving cradles are in particular each rigidly connected to one end of said supporting beam, and said supporting beam equipped with its two moving cradles thus forms a cluster gripping tool which can be inserted between the gripping plates of the upper, or lower, crossbeam and is capable of being supported, via its two cradles, by said plates.

In particular, said cluster gripping tool is capable of moving with respect to the gripping plates gripping it perpendicular to the longitudinal axis of the upper or lower crossbeam, in particular in order to accept a cluster, during disassembly or assembly of said cluster, in cooperation with said gripping plates. For this purpose, it may be advantageously equipped with movement means providing for movement of said gripping tool along said second direction, from an initial position centered on the longitudinal axis of said upper or lower crossbeam to a first and a second distant position, distributed symmetrically on each side of the initial position and suitable for accepting an upper or lower cluster. Preferentially, said movement means of said gripping tool is in particular also capable of moving said gripping tool along said first direction.

Advantageously, when a cluster is in said close position, said gripping tool is capable of moving from the initial position to the distant position, in the direction of said cluster in the close position, so that the latter is inserted between its moving cradles, the latter, rigidly connected to said supporting beam, being capable of moving simultaneously with respect to the gripping plates. Once the cluster is inserted between said moving cradles of the gripping tool, the locking bolts of each of the gripping plates gripping said cluster gripping tool are capable of rigidly connecting said cluster to said cradles, or in other words, to said gripping tool, and releasing said cluster from its supporting arms. The gripping tool rigidly connected to said cluster then returns to its initial position before being extracted from the roll stand by said extraction device. An opposite operation makes it possible to assemble a cluster rigidly connected to a gripping tool in the stand.

In another configuration, said gripping tool can also in particular be moved along said first direction (i.e. longitudinally with respect to the lateral supporting cylinder) by said movement means, and is in particular capable of having said cluster make said first movement and said second movement. In particular, said gripping tool is capable of accepting said cluster when the latter is in the close position between said gripping plates. Once the locking bolts of the gripping plates have rigidly connected said cluster to the moving cradles, the clamping system according to the first preferential embodiment is actuated, for example automatically by interaction of at least one of said locking bolts with said cluster, so as to release said cluster from its supporting arms. Next, the gripping tool is in particular capable of making said first movement so as to position the T-shaped end of the jack in said hollow of the locking space of the transverse beam. Advantageously, a space between the gripping plates and said cradles allows said first movement and locking bolts of a length suitable for said space and capable of being retracted from said space during movement of the cluster by the gripping tool along said first direction are capable of authorizing said movement.

Furthermore, the present invention is in particular characterized in that said upper and lower crossbeams each include a guidance means capable of guiding each of the crossbeams on a rail, in particular arranged on the shuttle, and extendable in the roll stand, for example by rails for disassembling the intermediate cylinders, intended to support sliding or rolling of their chocks. Said crossbeams include for example, as a guidance means, guide rollers or runners capable of moving on said extendable rail in the roll stand. Advantageously, each rail of the shuttle intended to cooperate with the sliding or rolling of the crossbeam can be extended by at least one other rail which may advantageously be one of said rails intended to disassemble the intermediate cylinders. Thus, each of said crossbeams is capable of moving on said rails in order to allow the extraction device to move from the gripping position to the parking position on said shuttle, and vice versa. The movement between said parking and gripping positions is in particular capable of being implemented by the moving member of said extraction device which is capable of acting on the strut rigidly connecting said upper and lower crossbeams in order to move them on said rails.

Also, said extraction device can in particular be housed in a compartment of said shuttle capable of changing at least one cluster and/or at least one lateral supporting cylinder of said roll stand by means of said extraction device. Said compartment includes in particular at least one side opening and at least one front opening, said front opening being intended to face said roll stand during use of the disassembly equipment, and provide for a movement of at least one part of said extraction device outside said compartment. Said front opening allows for example said crossbeams to move from the parking position in said compartment to the gripping position outside said compartment. Also, said compartment is in particular capable of being fed through said side opening by at least one moving bracket carriage comprising an upper bracket and a lower bracket each intended to act as a support for at least one cluster, respectively upper and lower, or at least one lateral supporting cylinder, respectively upper and lower. Said bracket carriage can possibly be engaged with or retracted from said compartment by a movement parallel to said second direction through said lateral opening, said movement being in particular implemented and capable of being controlled by a movement means of said bracket carriage capable of engaging the carriage in said compartment or retracting it therefrom. Said movement means is in particular automatic or automatable.

Advantageously, said shuttle possibly includes several consecutive compartments each intended to house a device providing for the extraction of said cylinders and/or clusters, for example said extraction device making it possible to change a lateral supporting cylinder and/or a cluster, and at least one other extraction device which can be housed in another compartment and is capable of extracting, for example, a working cylinder and/or an intermediate cylinder. Thus, said shuttle includes at least one other compartment including in particular at least one frontal opening, and capable of being arranged laterally, along said second direction, beside said compartment capable of being fed by said carriage. In particular, a first other compartment juxtaposed with said compartment capable of being fed by said carriage, and a second other compartment, juxtaposed with said first other compartment can be assembled side by side on said shuttle so as to form an assembly of three consecutive compartments.

Preferentially, said compartment capable of being fed by said bracket carriage includes, in particular on the same side, at least two side openings, each capable of being fed by a bracket carriage as described previously. Thus, the method for changing cylinders and/or clusters according to the invention is in particular characterized by a movement along a direction perpendicular to said first direction of a first bracket carriage, preferably intended to disassemble said lateral supporting cylinders and/or clusters and including at least one bracket intended to place the cluster or lateral supporting cylinder, and a second bracket carriage, preferably intended to assemble said lateral supporting cylinders and/or clusters and including at least one bracket intended to load a new cluster or a new lateral supporting cylinder. Said first carriage is in particular capable of moving between the parking position and a position for placing cylinders and/or clusters which are worn or intended to be replaced or repaired, and the second carriage is itself capable of moving between the intermediate loading position and a position for introducing new cylinders and/or clusters, for example new or repaired. Said placing position is for example situated outside said compartment, to one side of said side openings, opposite said parking position which is situated on the other side of said side opening, and said introduction position is for example situated outside said compartment, on each side of said openings, juxtaposed with said placing position, and opposite said intermediate position situated on the other side of said other opening.

Also, in order to provide for the disassembly of cylinders other than the lateral supporting cylinder, the disassembly equipment according to the invention is in particular characterized in that at least said other compartment, for example said first and said second other compartment, each includes said other extraction device capable of changing at least one working cylinder and/or at least one intermediate cylinder. Preferably, said other extraction device has the following characteristics:

- an extended body capable of being arranged with its length, perceptibly horizontally, along said first direction in said other compartment, for example, a first extended body in said first other compartment and a second extended body in said second other compartment;
- a gripping member of a working cylinder including two fixed jaws each capable of grasping a pin of a working cylinder is arranged at one end of said extended body and fixed to the latter, said gripping member being in particular capable of moving outside said other compartment, for example, a first gripping member equipping the first extended body and capable of moving outside the first other compartment, and a second gripping member equipping the second extended body and capable of moving outside the second other compartment;
- two bolts which can each be actuated by a jack, or possibly actuated by the same jack, are arranged in said extended body, and can emerge from it. They are also capable of each being locked on a chock of the intermediate cylinder or on a member added onto said chock. For this purpose, a surface of said chock or of said member added onto said chock allows for locking with said bolt of said extended body, forming for example a geometric surface complementary to a geometric shape of said bolt;
- a moving member of said extended body capable of moving said extended body, along said first direction, said extended body being able in particular to be rigidly connected or otherwise to the working cylinders, intermediate cylinders and their chocks. Said moving member is in all cases capable of moving said other extraction device during the replacement of working and/or intermediate cylinders.

Preferably, said two fixed jaws are respectively an upper jaw arranged above a lower jaw, capable of grasping respectively the pin of the upper working cylinder and the pin of the lower working cylinder, the upper jaw being connected to the lower jaw by a strut advantageously providing for simultaneous gripping of the lower working cylinder and the upper working cylinder. The disassembly equipment according to the invention is also characterized in that, in particular, each of said two jaws includes a lower fixed grip protruding with respect to a fixed upper grip, said lower grip being intended to be slid under the pin of the working cylinder when advancing the extended body of said other extraction device in the direction of the working cylinder and said fixed upper grip providing for sliding of said pin between said lower grip and said upper grip during said advance of said extended body.

For this purpose, said lower and upper grips each have, at their entrance, small-angle conical surfaces at the center facilitating the introduction of the pins of the working cylinders between said grips. In order to provide for such introduction even if there is a difference in altitude between the pins and the grips, said grips of said two jaws are preferably assembled on a device with free vertical movement providing for self-alignment of the grip and the pin. The free vertical movement is for example provided by two links capable of articulating a head including the upper and lower jaws, and the strut rigidly connecting them. Said head is articulated on a support including a low position stop making it possible to set a minimum vertical position of at least one of said jaws. Preferentially, said support is assembled movably on said extended body. For this purpose, a first clip device of said support for the extended body allows said support to pivot slightly about a perceptibly horizontal axis of rotation included in said extended body, and a second clip device of said support allows for pivoting of said support about said perceptibly horizontal axis of rotation, the first and the second clip devices both providing for rigid connection of said support to said extended body, and said second clip device including for example a fastening jack. Thanks to this configuration of a vertically moving head on a support capable of pivoting slightly with respect to said extended body, after introducing two cylinder pins between said grips of the two jaws, the head of the extraction device undergoes, thanks to said fastening jack, slight pivoting upwards in a vertical plane about said axis of rotation in order to produce temporary wedging of each of the pins intended to be accepted between each of the grips intended to accept them.

In order to provide for changing at least one working cylinder and/or at least one intermediate cylinder, the method for changing cylinders and/or clusters according to the invention is in particular characterized in that the disassembly of the working and/or intermediate cylinders includes the following steps:

- movement along said second direction of said other extraction device into an unloading position situated in an extension of said passage;
- movement along said first direction of said other extraction device, from said unloading position to a gripping position of at least one working cylinder and/or at least one intermediate cylinder;
- acceptance of at least one working cylinder and/or at least one intermediate cylinder. In particular, a first simultaneous acceptance of the upper working cylinder and respectively the lower working cylinder by said upper and respectively lower grip, said first simultaneous acceptance including insertion of one of the pins of each of the working cylinders into one of said grips, for example, the pin of the upper working cylinder situated to the side of said other extraction device is capable of being accepted by the upper grip of said head, while the lower grip of said head is capable of accepting the pin of the lower working cylinder situated on the same side as said other extraction device. Also, said first simultaneous acceptance also includes said slight pivoting upwards of said head of said other extraction device making it possible to hold said upper and lower working cylinders projecting by their respective pins in two zones separated from one another vertically. Also, said acceptance may also include a second simultaneous acceptance of the upper and lower intermediate cylinders by locking, by means of said bolts of said extended body, the chock of the upper intermediate cylinder situated to the side of said other extraction device during the change of cylinders, or a member added on to said chock, or respectively, the chock of the lower intermediate cylinder situated to the side of said other extraction device during the change of cylinders, or a member added on to said chock of said lower intermediate cylinder, to said extended body. Thus, a first bolt of said extended body is capable of rigidly connecting the chock of the upper intermediate cylinder or a member added on to the latter to said extended body, and a second bolt of said extended body is capable of rigidly connecting the chock of the lower intermediate cylinder or a member added on to the latter to said extended body, said chocks being the chocks situated close to said extended body during a change of cylinders;

retraction out of the roll stand of at least one working cylinder and/or at least one intermediate cylinder by moving said extended body out of said roll stand, each working cylinder intended to be retracted from the stand being held projecting by its pins and each intermediate cylinder intended to be retracted being locked by one of its chocks to said extended body by means of said bolt of said extended body. In particular, said other compartment of said other extraction device includes a pair of upper rails and respectively a pair of lower rails intended to extend a first pair of rails holding the chocks of the upper intermediate cylinder and respectively a second pair of rails holding the chocks of the lower cylinders. The pairs of upper, lower rails and the first and second pair of rails all being intended to provide for guidance in translation of the chocks of the intermediate cylinders during extraction of said intermediate cylinders out of the roll stand as far as said other compartment. Advantageously, each of the chocks of said intermediate cylinders includes means of movement on said rails, such as for example rollers or runners.

BRIEF DESCRIPTION OF THE SEVERAL VIEWS OF THE DRAWING

In order to provide a better understanding of the present invention, exemplary embodiments and applications are provided by means of the following figures.

DESCRIPTION OF THE INVENTION

Figure 1:
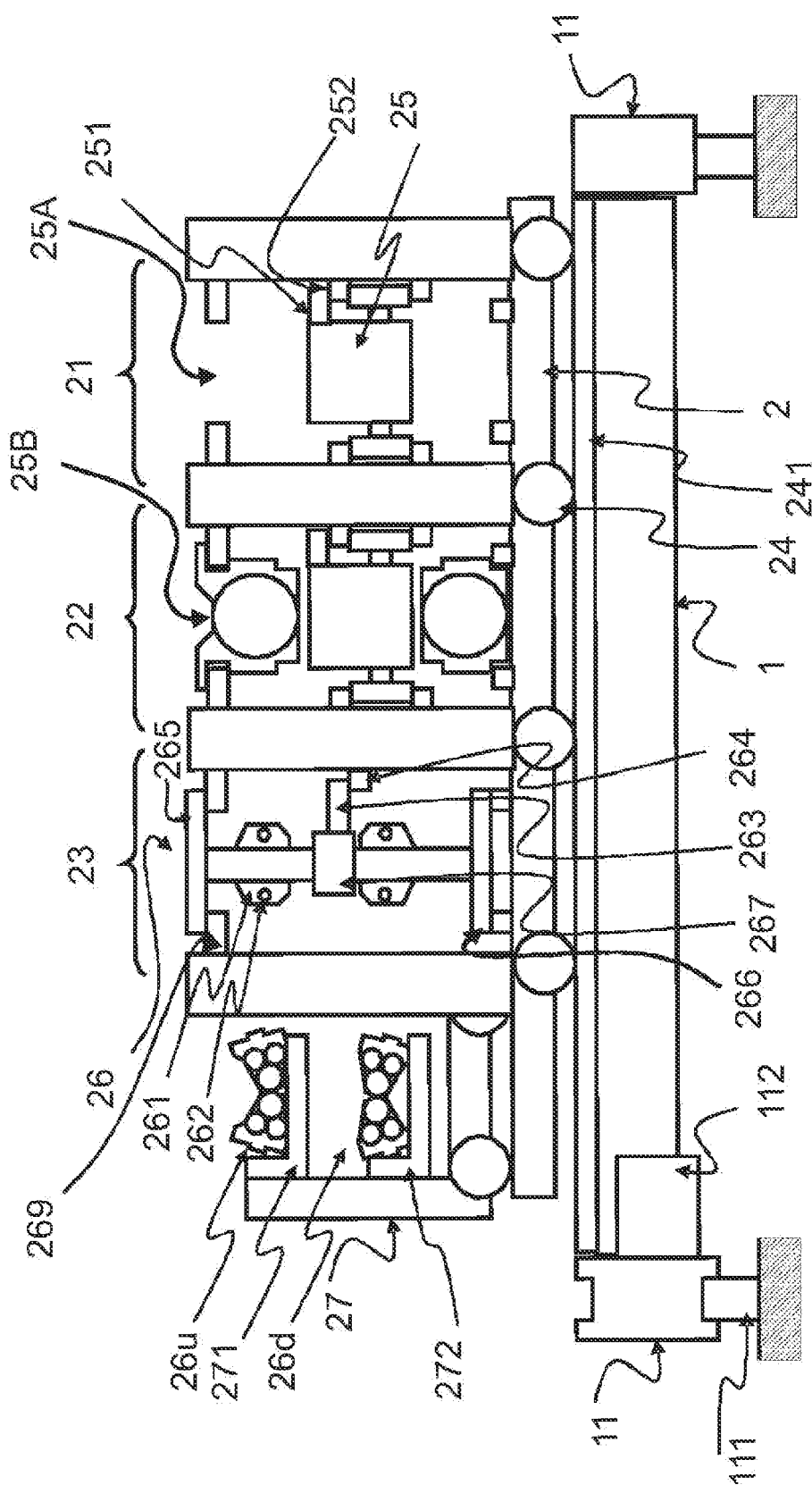
FIG. 1 exemplary embodiment according to the invention of an installation for changing at least one cylinder and/or at least one cluster of a roll stand.

FIG. 1 shows an exemplary embodiment according to the invention of equipment to disassemble at least one cylinder and/or at least one cluster of a 6-high roll stand supported laterally, in particular as described later in FIG. 10. The disassembly equipment is suitable for changing cylinders and/or clusters of said roll stand and is capable of changing at least one cylinder and/or at least one cluster of said roll stand. The disassembly equipment according to the invention includes:

a handling frame 1, in particular able to be positioned by the operator of the rolling installation and including positioning and moving means capable of moving and positioning same along a first direction parallel to a longitudinal axis of rotation of the working cylinders when the latter are assembled in the roll stand. In particular, said frame 1 is capable of moving by means of wheels 11 circulating on rails 111, in particular rectilinear and capable of being arranged by the operator of the rolling installation, parallel to said first direction;

a mobile shuttle 2 capable of moving over said frame along at least one second direction perpendicular to said first direction, for example by means of wheels 24 capable of circulating on rails 241 rigidly attached to said frame 1.

Figure 5:
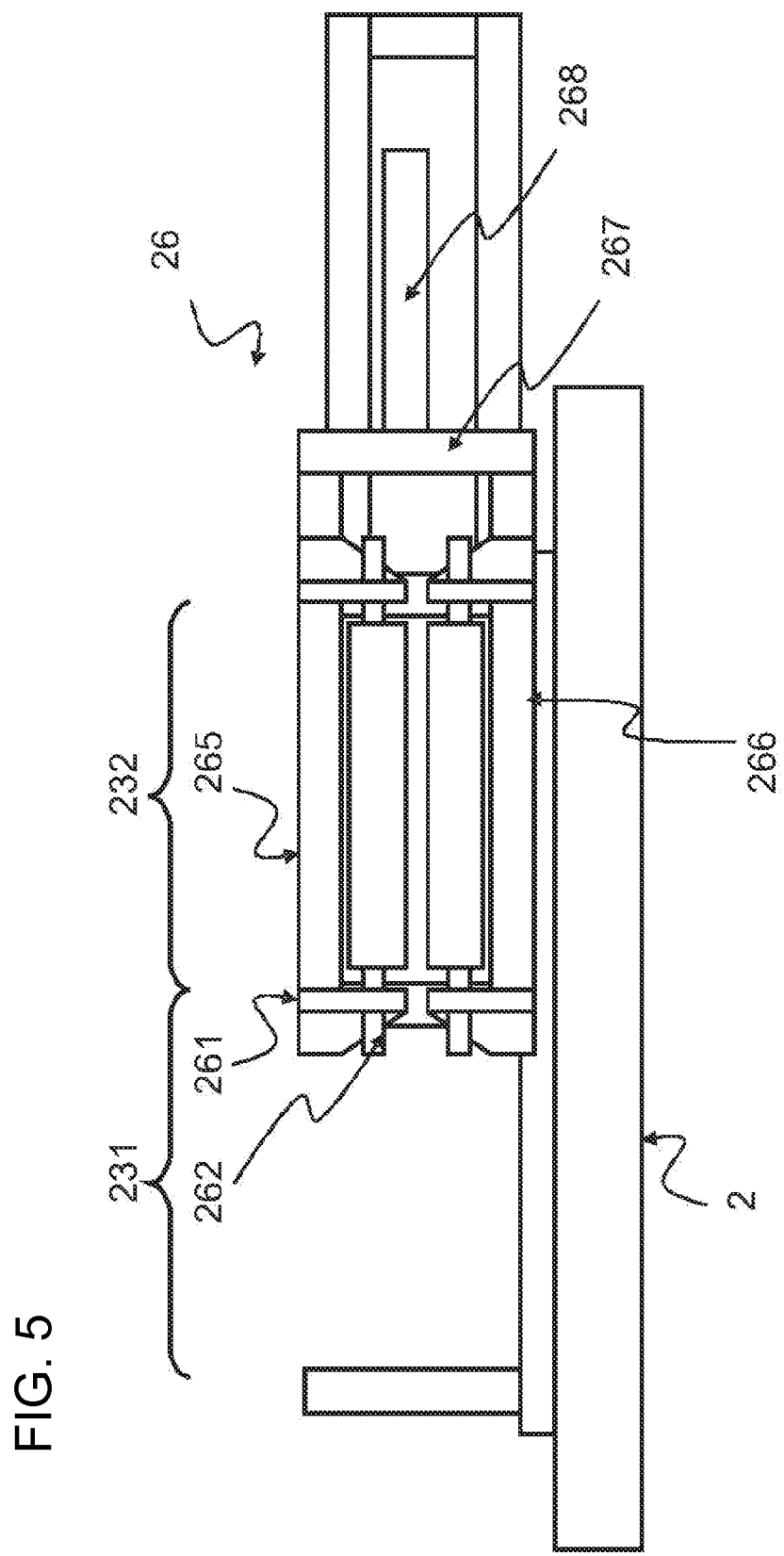
FIG. 5 exemplary embodiment of an extraction device of disassembly equipment according to the invention.

The disassembly equipment according to the invention is also characterized in that said shuttle 2 includes an extraction device 26 capable of disassembling from the roll stand, or assembling on it, one or more clusters and/or one or more lateral supporting cylinders. Said extraction device 26, described in more detail in FIG. 5, includes:

an upper crossbeam 265 for disassembling at least one upper cluster 26u and/or at least one upper lateral supporting cylinder rigidly connected by means of a movable strut 267 to a lower crossbeam 266 intended to change at least one lower cluster 26d and/or at least one lower lateral supporting cylinder, said lower crossbeam 266 being arranged below said upper crossbeam 265. In particular, each of said crossbeams includes at each of its ends a moving gripping plate 261 including at least one locking bolt 262, said gripping plates 261 of a single crossbeam, respectively, the two gripping plates of the upper crossbeam 265 and the two gripping plates of the lower crossbeam 266, being intended to grip at least one cluster and/or at least one lateral supporting cylinder by actuating said locking bolt 262. In particular, the two plates equipping the upper crossbeam 265 are each capable of being rigidly connected/disconnected, in particular simultaneously and by actuating at least one of their locking bolts, to or from an upper lateral supporting cylinder or to or from an upper cluster 26*u* or to or from two upper lateral supporting cylinders or to or from two upper clusters 26*u* or to or from an upper lateral supporting cylinder and an upper cluster. Similarly, the two plates equipping the lower crossbeam 265 are each capable of being rigidly connected/disconnected, in particular simultaneously and by actuating at least one of their locking bolts, to or from a lower lateral supporting cylinder or to or from a lower cluster 26*d* or to or from two lower lateral supporting cylinders or to or from two lower clusters 26*d* or to or from a lower lateral supporting cylinder and a lower cluster 26*d*. In particular, each plate equipping an upper, respectively lower, crossbeam includes on the one hand, two cluster locking bolts intended to lock an upper 26*u*, respectively lower 26*d*, cluster, either a first upper, respectively lower, cluster locking bolt intended to lock the upper 26*u*, respectively lower 26*d*, cluster situated laterally to one side of the upper, respectively lower, working cylinder and a second upper, respectively lower, cluster locking bolt capable of locking the upper 26*u*, respectively lower 26*d*, cluster situated laterally to the other side of said upper, respectively lower, working cylinder and on the other hand, two upper, respectively lower, lateral supporting cylinder locking bolts, either a first upper, respectively lower, lateral supporting cylinder locking bolt intended to lock the upper, respectively lower, lateral supporting cylinder situated laterally to one side of the upper, respectively lower, working cylinder and a second upper, respectively lower, lateral supporting cylinder locking bolt capable of locking the upper, respectively lower, lateral supporting cylinder situated laterally to the other side of said upper, respectively lower, working cylinder. Preferentially, each of said crossbeams includes guide rollers or runners (not represented) capable of moving on rails 269 situated in the shuttle, rigidly connected to the latter, and extendable, in the roll stand, by other rails which are able, particularly advantageously, to be rails intended to change intermediate cylinders;

a moving member 268 of said extraction device capable of moving said extraction device 26 along said first direction by acting on said rigidly connected strut of the upper crossbeam and the lower crossbeam. In particular, said strut 267 can be mechanically connected to said moving member 268 so that the latter can provide for the simultaneous movement of the upper and lower crossbeam, and thus of the extraction device 26, by moving said strut. Preferentially, said moving member 268 provides for positioning and movement of said extraction device 26 between a gripping position in the roll stand suitable for accepting at least one cluster and/or at least one lateral supporting cylinder, a parking position 232 situated on said shuttle, outside the roll stand, and an intermediate position 231, situated on said shuttle and between said parking position and the gripping position, allowing for example acceptance of at least one new or repaired cluster and/or working cylinder by the extraction device 26. This moving member may be, as an example, a pinion 263 driven by a motor (not represented) and meshing on a rack 264, as presented in FIG. 1 or 7.

Advantageously, said shuttle 2 described in FIG. 1 includes in particular several consecutive compartments:

- a compartment 23 capable of housing said extraction device 26 for at least one cluster and/or at least one lateral supporting cylinder. Advantageously, said moving member of said extraction device is in particular capable of moving at least a part of said extraction device from the parking or intermediate position in said compartment 23 on said shuttle to a gripping position outside said compartment 23 in said roll stand, in particular along a direction of movement perpendicular to the direction of travel of the strip, so as to provide, during a change of a cylinder or a cluster, for the advance and respectively the retraction of said part of said extraction device into, and respectively out of the roll stand;
- a first other compartment 21 capable of housing a first other extraction device 25A capable of changing at least one working cylinder and/or at least one intermediate cylinder. During use of the disassembly equipment, said first other compartment 21 is for example empty, awaiting an extraction of one or more working cylinders or intermediate cylinders,
- a second other compartment 22 capable of housing a second other extraction device 25B similar to said first other extraction device and also capable of replacing at least one working cylinder and/or at least one intermediate cylinder. During use of the disassembly equipment, said second other compartment 22 is for example equipped with a set of new working cylinders or intermediate cylinders ready to be assembled by replacing worn working or intermediate cylinders which can be replaced by said first other extraction device.

According to a preferential embodiment, lateral to the compartment 23 capable of housing the extraction device 26, at least one bracket carriage 27 comprising an upper bracket 271 and a lower bracket 272, each allowing at least one cluster and/or at least one lateral supporting cylinder to be placed, can be engaged in the compartment 23 or retracted from said compartment 23, by a movement parallel to the travel of the strip, so as to accept respectively at least one cluster and/or at least one lateral supporting cylinder, in particular at least one upper cluster and/or at least one upper lateral supporting cylinder on the upper bracket 271, and respectively at least one lower cluster and/or at least one lower lateral supporting cylinder on the lower bracket 272.

Figure 2:
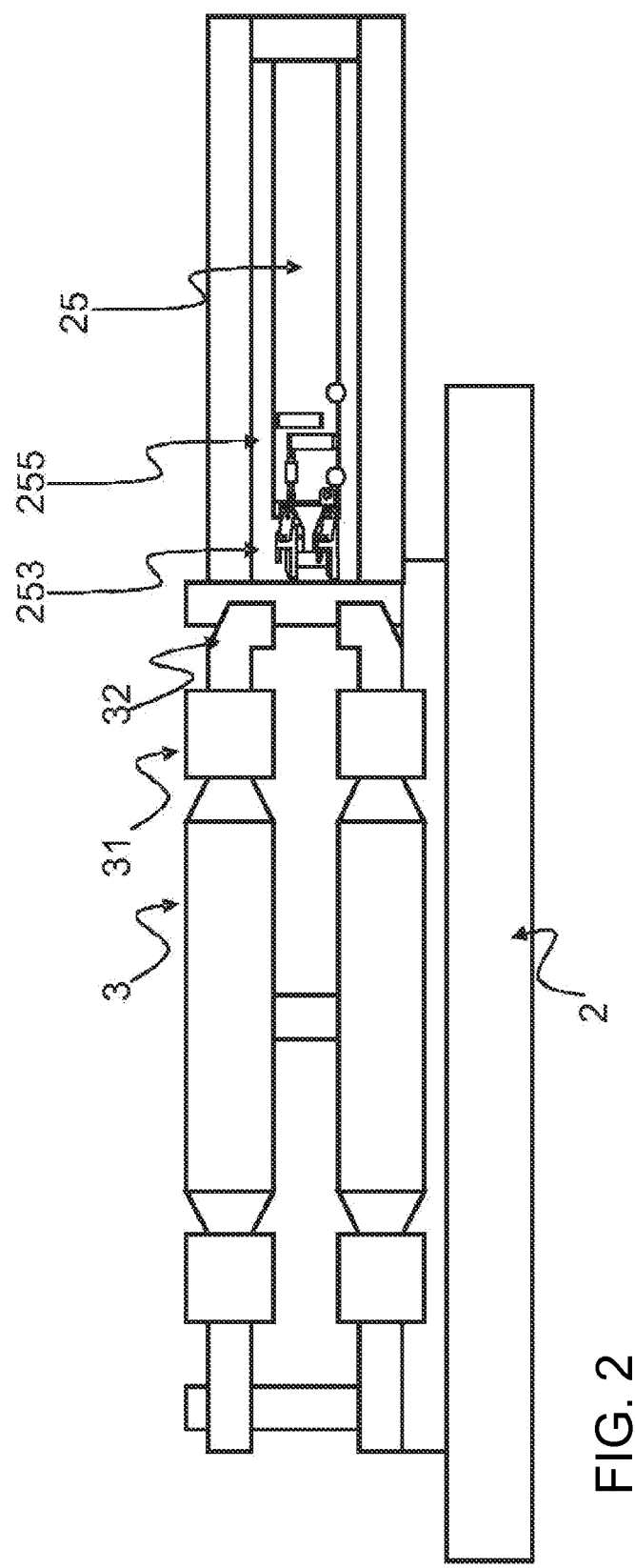
FIG. 2 exemplary embodiment according to the invention of said other extraction device capable of changing at least one working cylinder and/or at least one intermediate cylinder.
Figure 3:
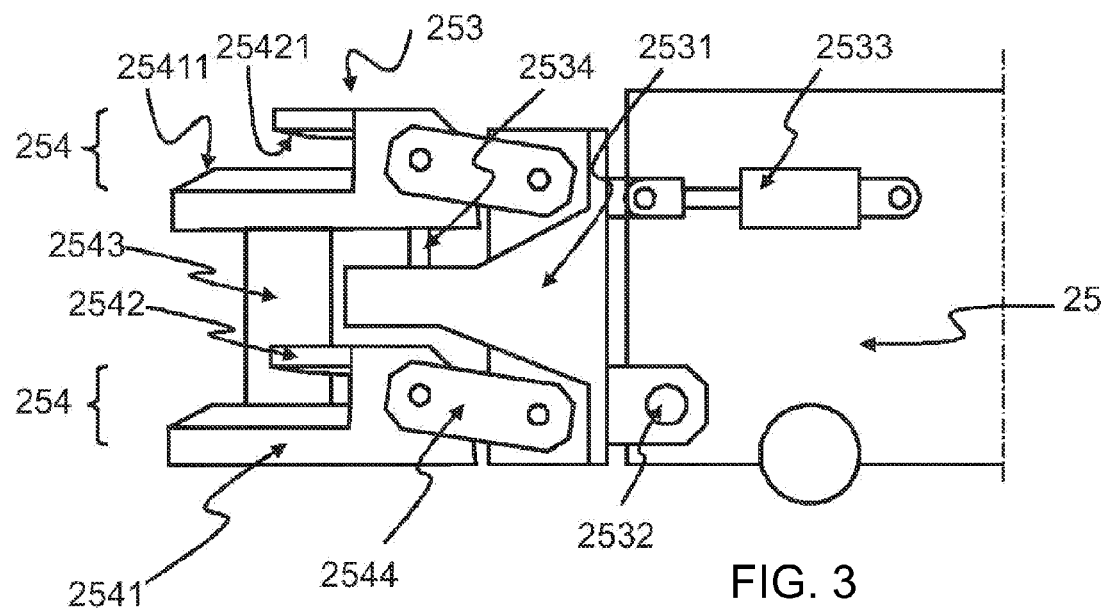
FIG. 3 exemplary embodiment according to the invention of a gripping member of said other extraction device.
Figure 4:
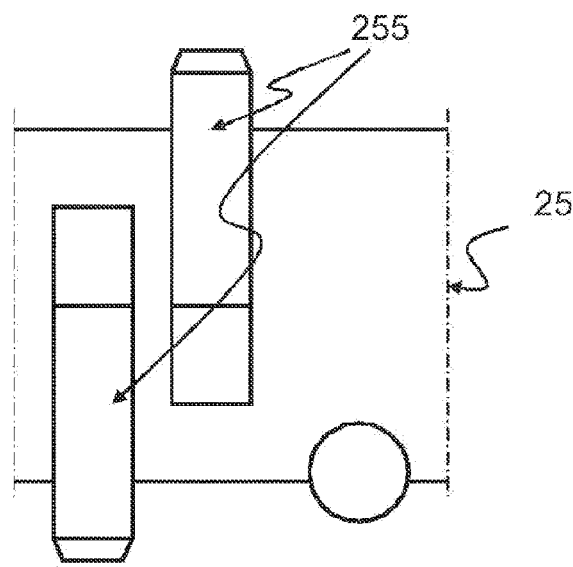
FIG. 4 exemplary embodiment according to the invention of bolts of said other extraction device, intended for rigid connection/disconnection to or from a chock of an intermediate cylinder.

The first and second other extraction device 25A, 25B are in particular identical and include, according to the invention and as illustrated in FIGS. 2 to 4:

- an extended body 25 capable of being arranged in length, perceptibly horizontally, along said first direction in said other compartment, for example, a first extended body in said first other compartment and a second extended body in said second other compartment;
- a gripping member 253 of a working cylinder, in particular capable of grasping, by means of at least one fixed jaw, at least one working cylinder, or, preferentially, including two fixed jaws each capable of grasping simultaneously the two working cylinders by one of their pins. An example of a gripping member according to the invention is described in detail in FIG. 3.

two bolts 255 assembled in said extended body can each be actuated by a single jack or by a different jack, said bolts being capable of locking or rigidly connecting chocks of the intermediate cylinders or members added on to said chocks with said extended body. An example of bolts according to the invention is described in FIG. 4.

a moving member of said extended body 25 capable of moving, in particular perpendicular to the direction of travel of the strip, said extended body 25 from a position situated inside its compartment to a position situated outside said compartment and allowing, in particular during use of the disassembly equipment, said gripping member to grasp at least one of the working cylinders and/or to be rigidly connected to at least one intermediate cylinder. In particular, a first moving member makes it possible to move said first other extraction device with respect to its compartment and a second moving member makes it possible to move said second other extraction device with respect to its compartment. This moving member may be, as an example and as illustrated in FIG. 1, a pinion 251 driven by a motor (not represented) and meshing on a rack 252.

FIG. 3 describes an exemplary embodiment of a gripping member 253 for at least one working cylinder according to the invention. This gripping member 253 includes in particular two fixed jaws 254, respectively an upper jaw intended to grasp a pin of an upper working cylinder and a lower jaw intended to grasp a pin of a lower working cylinder joined by a strut 2543 providing for the simultaneous gripping of the lower working cylinder and the upper working cylinder by grasping one of their respective pins with each of said fixed jaws 254. Each of the two jaws 254 includes, for this purpose, a lower fixed projecting grip 2541 intended to be slid beneath the pin when advancing said extended body 25 in the direction of said pin, and an upper fixed grip 2542 beneath which the pin slides until the end of the advance of said extended body 25.

The lower 2541 and respectively upper 2542 grips each have, at their entrance, lower 25411, and respectively upper 25421, small-angle conical surfaces at the center facilitating the introduction of the pin of the working cylinder into the grip. In order to provide for such introduction even if there is a difference in altitude between the pin of the upper working cylinder and the upper grip, and the pin of the lower working cylinder and the lower grip, said grips are advantageously assembled on a device with free vertical movement providing for the vertical self-alignment of each of the grips with their respective pins. For example, two links 2544 are capable of articulating a head 253, including said jaws and the strut rigidly connecting them together, on a support 2531 including a low stop position 2534 capable of setting a minimum vertical position of the head with respect to said support, the latter being assembled movably on said extended body. In order to change the working cylinders, following the simultaneous introduction of the pin of the upper working cylinder into the grips of the upper jaw and the pin of the lower working cylinder into the grips of the lower jaw, the support 2531 of the head 253 undergoes, thanks to a fastening jack 2533, slight pivoting upwards in a vertical plane about an axis of rotation 2532, in order to produce temporary wedging of the pins between the grips, and thus making it possible for the working cylinders to be grasped overhanging by their pins.

FIG. 4 describes an example of bolts 255 according to the invention, assembled in said extended body 25, intended for the extraction of the intermediate cylinders and each operating as a jack. Each of these bolts 255 is in particular capable of locking or rigidly connecting a chock of an intermediate cylinder to said extended body by insertion of said bolt into a housing of said chock or a member added on to said chock, said housing having in particular a geometry complementary to said bolt. In particular, said two bolts 255 are respectively an upper bolt intended to rigidly connect one of the chocks of the upper intermediate cylinder to said extended body and a lower bolt intended to rigidly connect one of the chocks of the lower intermediate cylinder to said extended body.

Figure 6:
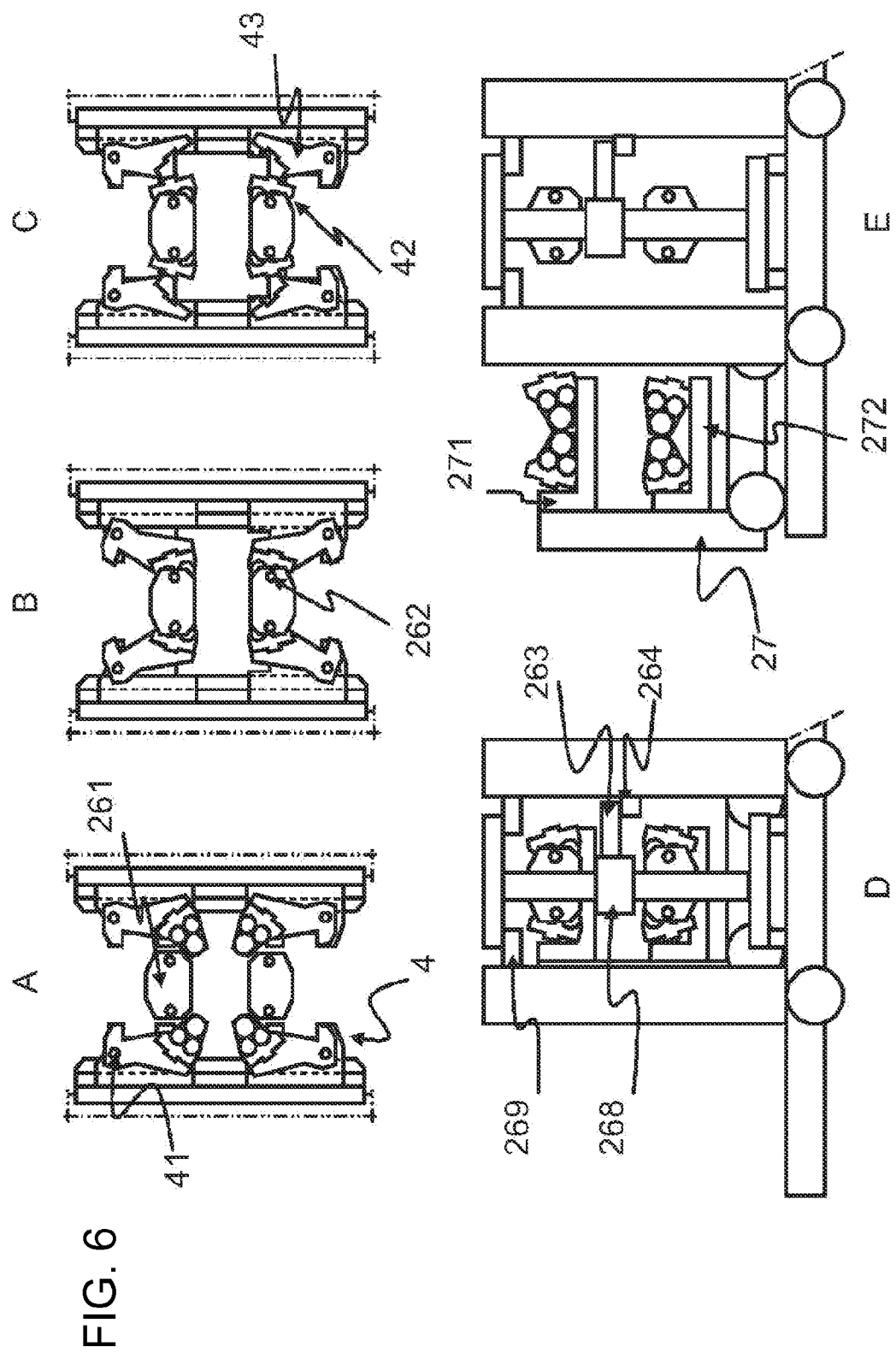
FIG. 6 example of steps which can be implemented by the disassembly equipment according to the invention and providing for the simultaneous change of four clusters of a roll stand.

FIG. 6 describes a set of steps which can be implemented by the disassembly equipment according to the invention, and providing in particular for a simultaneous change of four clusters of a roll stand:

In a first stage, the working and intermediate cylinders are extracted from the roll stand by said other extraction device according to the invention. Next, the lateral supporting members 4 are pivoted about their axes of pivot 41 under the action of jacks (not represented) toward a distant position as indicated in FIG. 6A. Henceforth, the extraction device according to the invention is capable of advancing toward the stand from its parking position 232 (see FIG. 5) to the gripping position in the roll stand. In particular, said moving member of said extraction device is capable of positioning the latter centered with respect to the roll stand so as to allow each lateral supporting member to pivot from the distant position to a close position providing for insertion of its cluster between two gripping plates 261, as indicated in FIG. 6B. In this way, the gripping plates of each crossbeam are capable of accepting two clusters.

In a second stage, after this pivoting in close position, each transverse beam 42 of each cluster is accepted by two cluster locking bolts 262 carried by the gripping plates 261 of a crossbeam, either a cluster locking bolt carried by the gripping plate assembled at one end of the crossbeam and being capable of locking or rigidly connecting one end of the crossbeam 42 to said plate 261, for example by insertion of said locking bolt into the cavity of the transverse beam 42, and a second cluster locking bolt carried by the gripping plate assembled at the other end of the crossbeam and being capable of locking or rigidly connecting the other end of the transverse beam to said gripping plate assembled at the other end of the crossbeam, for example by insertion of said locking bolt into the other cavity of the transverse beam. Once the plates have been rigidly connected to the cluster, clamping members, each providing, for a supporting arm 43 of a transverse beam 42, the rigid connection of said transverse beam 42 to said supporting arm 43, are released, in particular simultaneously, in order to provide for the extraction of the clusters by the extraction device. Preferentially, the release of the clamping members is capable of being controlled mechanically, electronically or electromechanically by a control system which can be actuated by interaction of at least one of said cluster locking bolts with the cluster. Thus, the rigid connection of the gripping plates of a crossbeam to a cluster may give rise automatically, via said control system, to the release, or disconnection, of the cluster from its supporting arms. Examples of implementation of said clamping members according to the invention are given in FIG. 13.

In a third stage, the supporting arms 43 disconnected from the transverse beam 42 are pivoted, in particular simultaneously, in a distant position so as to leave a free passage for the extraction device outside the stand, as indicated in FIG. 6C. The extraction device is then moved by said moving member to the parking position 232 on the shuttle. The four clusters carried by said extraction device, i.e. the two upper clusters accepted by the two plates of the upper crossbeam, and the two lower clusters accepted by the two plates of the lower crossbeam, are thus extracted from the roll stand.

In a fourth stage, and as indicated in FIG. 6D, a first placing bracket carriage 27 which may advantageously be arranged laterally with respect to the shuttle compartment 23 (see FIG. 1) including said extraction device, and comprising an upper bracket 271 and a lower bracket 272, can be engaged in this shuttle compartment 23 by a movement parallel to the travel of the strip, so as to accept respectively the two upper clusters on the upper bracket 271, and the two lower clusters on the lower bracket 272, said clusters being in particular automatically released on detachable supports equipping each of said brackets, each detachable support being in particular intended to support at least one of said clusters on the bracket which it equips, when said cluster is being placed by said extraction device.

Said first bracket carriage 27 and its brackets 271, 272 each carrying two clusters can then be extracted from the shuttle compartment, freeing the extraction device for the acceptance of new clusters, so as to introduce them into the roll stand in place of those previously disassembled. For this purpose, the moving member moves the extraction device in the direction of the roll stand, from the parking position to the intermediate position 231 (see FIG. 1). Advantageously, said intermediate position is capable of being fed by a second bracket carriage including, identically to said first bracket carriage, an upper bracket and a lower bracket each intended to carry two new clusters. The second bracket carriage can be engaged in the compartment 23 by a movement parallel to the travel of the strip so as to put the two new upper clusters carried by its upper bracket and the two new lower clusters carried by its lower bracket in a position providing for their acceptance by the extraction device.

In a fifth stage, following acceptance of said clusters by said extraction device, the latter is moved by said moving member from the intermediate position 231 to the gripping position in the roll stand. Each of the supporting arms 43 pivots, in particular simultaneously, from the distant position to the close position by being inserted between two gripping plates 261 until there is contact with the transverse beams 42 of the new clusters. The clamping members can then be actuated, in particular automatically, as soon as contact is made, so as to provide for rigid connection of the transverse beams of the new clusters to their respective supporting arms. Each cluster locking bolt 262 of each gripping plate 261 is released. In particular, during rigid connection of the new cluster to its supporting arms, the actuation of at least one of the clamping members of the new cluster, in particular a position of the rod of a jack of one of said clamping members of the cluster, is capable of automatically causing the unlocking, or disconnection, of the cluster locking bolts of said new cluster. For this purpose, the control system is in particular capable of identifying a binary state of rigid connection of said clamping member (i.e. a first state corresponding to the clamping system being rigidly connected to the crossbeam and a second state corresponding to the clamping system not being rigidly connected to the transverse beam, i.e. released from the latter), for example by interaction with said jack, or by means of measuring a position of the jack of said clamping member. Once said new clusters have been rigidly connected to their supporting arms, the four reconstituted lateral supporting members 4 can then pivot in distant position so as to allow free passage for the extraction device, which is then capable of being moved by the moving member in parking position 232 in the shuttle compartment 23.

Figure 7:
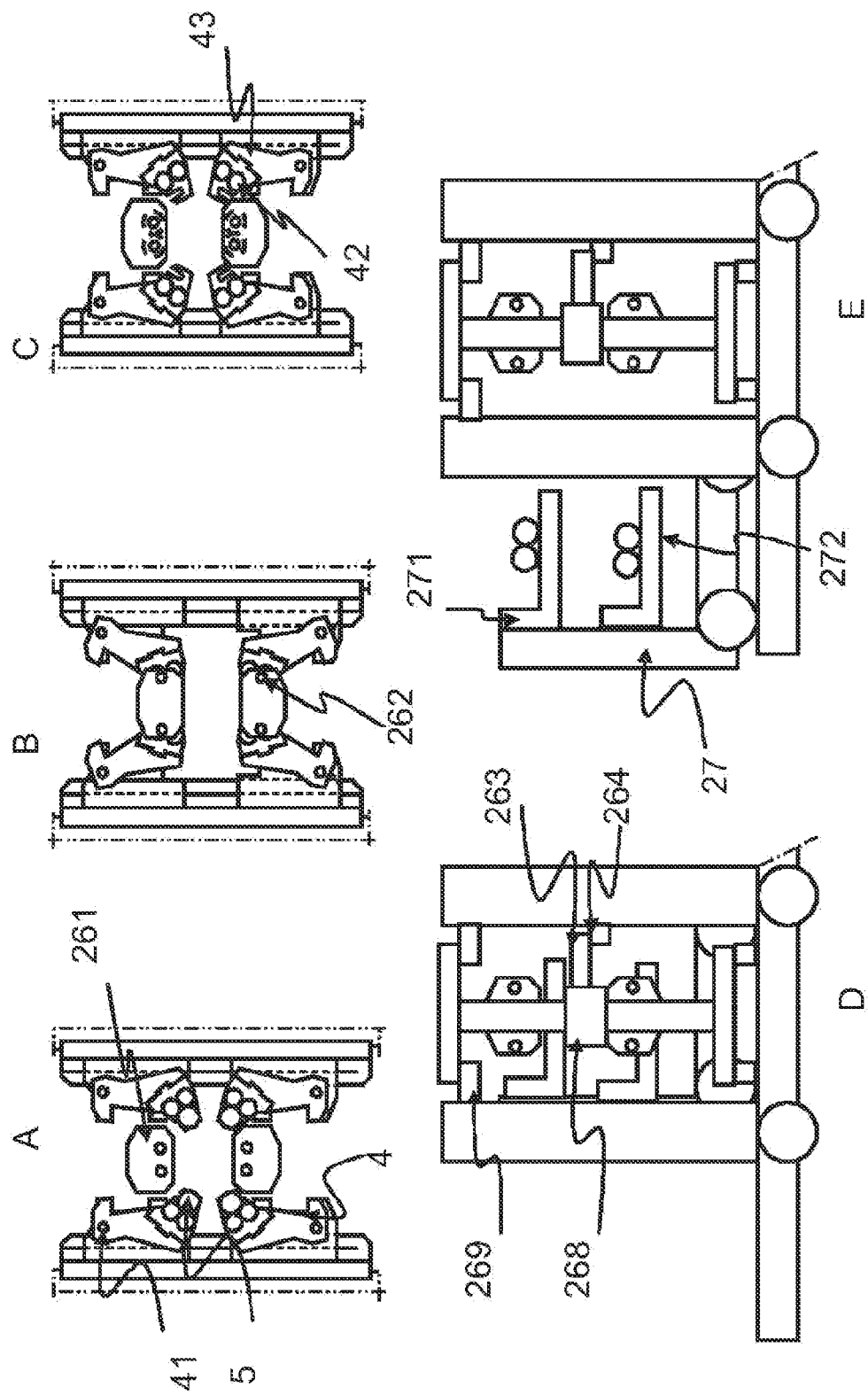
FIG. 7 example of steps which can be implemented by the disassembly equipment according to the invention and providing for the simultaneous change of four lateral supporting cylinders.

FIG. 7 describes a set of steps which can be implemented by the disassembly equipment according to the invention, and providing in particular for a simultaneous change of four lateral supporting cylinders:

In a first stage, the working and intermediate cylinders are extracted from the roll stand by said other extraction device according to the invention. Next, the lateral supporting members 4 are pivoted about their respective axes of pivot 41 under the action of jacks (not represented) toward a distant position as indicated in FIG. 7A so as to free a passage for the extraction device. Henceforth, the extraction device according to the invention is capable of advancing toward the stand from its parking position 232 to the gripping position in the roll stand. In particular, said moving member of said extraction device is capable of centering the latter with respect to the roll stand so as to allow each lateral supporting member to pivot from the distant position to a close position providing for insertion of its cluster between two gripping plates 261, as indicated in FIG. 7B. In this way, the gripping plates of each crossbeam are capable of accepting two lateral supporting cylinders of a single working cylinder.

In a second stage, after this pivoting in close position, each lateral supporting cylinder 5 of each cluster is accepted by two lateral supporting cylinder locking bolts 262 carried by the gripping plates 261 of a crossbeam, namely a lateral supporting cylinder locking bolt carried by the gripping plate assembled at one end of the crossbeam and capable of locking or rigidly connecting one end of said lateral supporting cylinder to said plate and a second lateral supporting cylinder locking bolt carried by the gripping plate assembled at the other end of the crossbeam and capable of locking or rigidly connecting the other end of said lateral supporting cylinder to said plate assembled at the other end of the crossbeam. In particular, the locking of the lateral supporting cylinder by means of said lateral supporting cylinder locking bolts is capable of automatically actuating a locking system of said lateral supporting cylinder, which is capable of actuating, simultaneously with the locking of said lateral supporting cylinder by at least one lateral supporting cylinder locking bolt, the unlocking of said lateral supporting cylinder from its cluster.

In a third stage, the supporting arms 43 of each cluster are pivoted, in particular simultaneously, in a distant position so as to leave a free passage for the extraction device outside the stand, as indicated in FIG. 8C. The extraction device, henceforth supporting the four lateral supporting cylinders of the roll stand, is then moved by said moving member to the parking position 232 on the shuttle. The four lateral supporting cylinders, i.e. the two upper lateral supporting cylinders accepted by the two plates of the upper crossbeam, and the two lower lateral supporting cylinders accepted by the two gripping plates of the lower crossbeam, are thus extracted from the roll stand.

In a fourth stage, and as indicated in FIG. 8D, the first placing bracket carriage 27 of said shuttle compartment 23, said placing bracket carriage 27 comprising the upper bracket 271 and the lower bracket 272, can be engaged in this shuttle compartment by said movement parallel to the travel of the strip, so as to accept respectively the two upper lateral supporting cylinders on the upper bracket 271, and the two lower lateral supporting cylinders on the lower bracket 272, said lateral supporting cylinders being in particular automatically released on detachable supports equipping each of said brackets, each of said detachable supports being in particular capable of supporting at least one lateral supporting cylinder on the bracket which said detachable support equips, from the placing of said lateral supporting cylinder by said extraction device.

Said first bracket carriage 27 and its brackets 271, 272 each carrying two lateral supporting cylinders can then be extracted from the shuttle compartment, freeing the extraction device for the acceptance of new lateral supporting cylinders, so as to introduce them into the roll stand in place of those previously disassembled. For this purpose, the moving member moves the extraction device in the direction of the roll stand, from the parking position to the intermediate position 231. Advantageously, said intermediate position is capable of being fed by the second bracket carriage, the upper bracket and the lower bracket of which are each capable of carrying two new lateral supporting cylinders. The second bracket carriage can be engaged in the shuttle compartment 23 by said movement parallel to the travel of the strip so as to put the two new upper lateral supporting cylinders carried by its upper bracket and the two new lower lateral supporting cylinders carried by its lower bracket in a position providing for their acceptance by the extraction device.

In a fifth stage, the extraction device is moved by said moving member from the intermediate position to the gripping position capable of being centered with respect to the roll stand. Each of the supporting arms 43 of each cluster pivots, in particular simultaneously, from the distant position to the close position by being inserted between two gripping plates 261 as far as a position allowing the lateral supporting cylinder to be locked with its cluster. The locking bolts of each lateral supporting cylinder are then released simultaneously, causing the simultaneous unlocking of each lateral supporting cylinder from its gripping plates. This unlocking simultaneously actuates the locking system of said lateral supporting cylinder, which is capable of rigidly connecting the lateral supporting cylinder to its cluster simultaneously with the disconnection of its gripping plates. The four reconstituted lateral supporting members 4 can then pivot in distant position so as to allow a free passage for the extraction device, which is then moved by the moving member in parking position 232 in the shuttle compartment.

Figure 8:
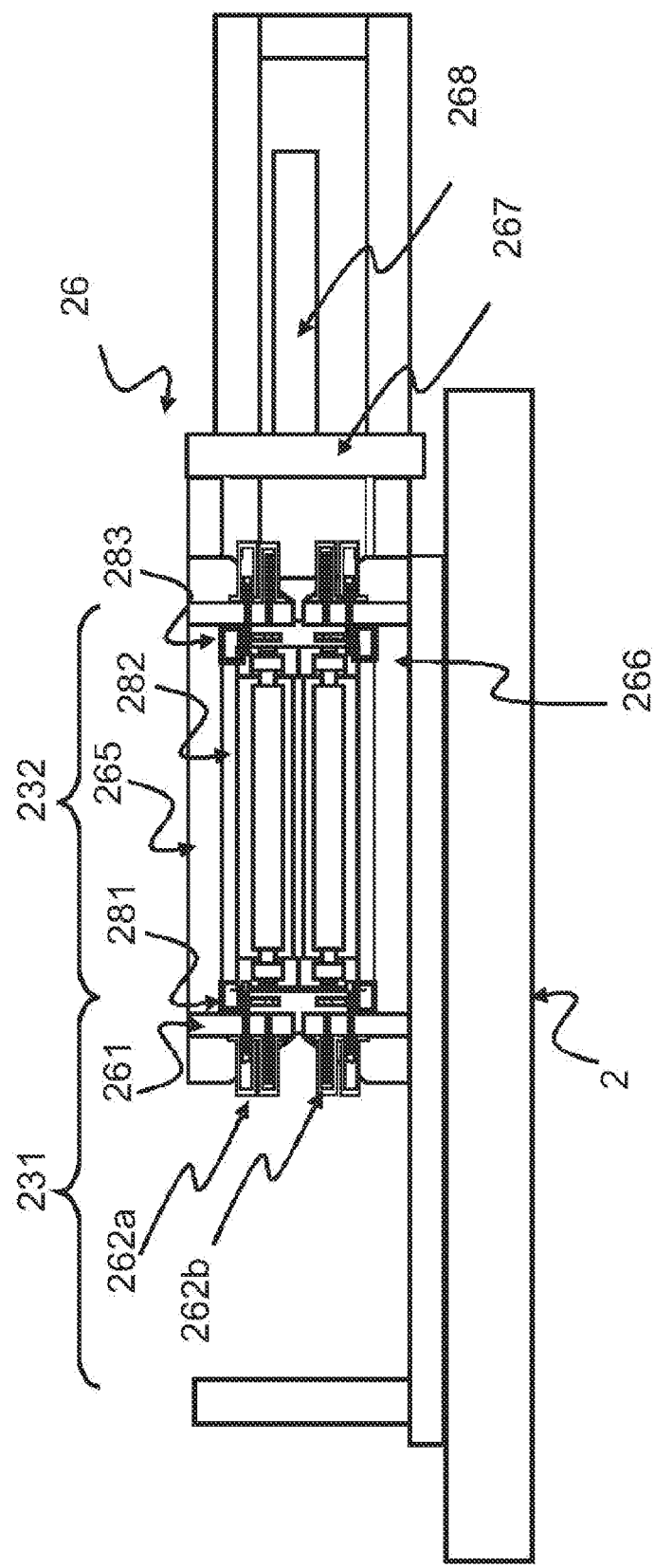
FIG. 8 exemplary embodiment of said extraction device including at least one cradle which can be rigidly connected to a cluster.

FIG. 8 presents an exemplary embodiment of an extraction device 26 capable of equipping the shuttle 2 according to the invention. As before, said extraction device includes the upper crossbeam 265 rigidly connected by means of the moving strut 267 to the lower crossbeam 266, the moving member 268, capable of moving said extraction device, preferably in and out of the roll stand, and in particular between the parking position 232 and the intermediate position 231. Each crossbeam, upper or lower, is fitted at each of its ends with a gripping plate 261 including at least four locking bolts: in particular two cluster locking bolts 262*a* and two lateral supporting cylinder locking bolts 262*b*. Each cluster locking bolt 262*a* of a gripping plate situated at one end of a crossbeam is intended to cooperate with another cluster locking bolt of another gripping plate situated at the other end of said crossbeam in order to provide for the rigid connection/disconnection of a cluster with said extraction device. Also, each lateral supporting cylinder locking bolt 262*b* of a gripping plate situated at one end of a crossbeam is intended to cooperate with another lateral supporting cylinder locking bolt 262*b* of another gripping plate situated at the other end of said crossbeam in order to provide for the rigid connection/disconnection of a lateral supporting cylinder 262*b* to or from said extraction device. Said cooperation between locking bolts in particular enables then to be actuated simultaneously.

Preferentially, each gripping plate 261 is capable of cooperating with a moving gripping cradle 281, 283 and of acting as a support for it. Said cradle is in particular able to be positioned between said gripping plate and said cluster during the assembly/disassembly of a cluster or a lateral supporting cylinder and also includes a supporting member capable of resting on said gripping plate, while allowing a relative movement of said cradle with respect to said plate, and also possible disconnection of said cradle from the plate with which it is cooperating. In particular, a supporting beam 282 rigidly connects a first cradle 281 to a second cradle 283. Thus, the supporting beam 282 is fitted at one of its ends with said first cradle 281, and at the other of its ends, with said second cradle 283 so as to form a gripping tool. This gripping tool in particular has an upright U shape when it equips a lower crossbeam, and a symmetrical shape, i.e. an upside down U, when it equips an upper crossbeam. Advantageously, said gripping tool is in particular capable of cooperating with said gripping plates during the rigid connection/disconnection of a cluster or a lateral supporting cylinder to or from said extraction device. Thus, the upper crossbeam 265 and the lower crossbeam 266 are each capable of being equipped with one of said gripping tools including said supporting beam 282 fitted with a cradle 281, 283 at each of its ends.

Preferentially, each gripping tool includes movement means making it possible to move said gripping tool perpendicular to the longitudinal axis of the crossbeam which it is intended to equip and means for stabilizing said cluster, for example adjustable stabilization fingers positioned on said supporting beam and capable of docking with said cluster. Also, each gripping tool is in particular capable of being disconnected from the upper or lower crossbeam it equips, remaining in particular rigidly connected to a cluster during the placing of the later outside the roll stand on a holding bracket. For this purpose, each transverse beam of each cluster may in particular include at each of its longitudinal ends, said cavity intended to cooperate with said cluster locking bolt of the gripping plate. This cavity provides for the rigid connection of the cluster with its gripping plates, for example by insertion of the cluster locking bolt 262*a* of each plate in its respective cavity, or by pressing the cluster locking bolt onto a trigger situated in said cavity and one end of which is capable of emerging from said cavity. Also, said cavity provides for disconnection of the gripping plates from said cluster, for example by retraction of said cluster locking bolt 262*a* out of said cavity, or by releasing the pressure exerted by the cluster locking bolt on said trigger. Advantageously, said trigger provides in particular for rigid connection of the cluster to the cradles 281, 283 of said gripping tool during said release of the pressure exerted by said cluster locking bolt 262*a* in the direction of said cavity. In fact, said pressure which can be exerted by said cluster locking bolt against said trigger is capable of compressing said trigger, and the release of the pressure which can be exerted by said cluster locking bolt against said trigger is capable of releasing said trigger, which is then capable of locking said cluster to said gripping tool.

Figure 9:
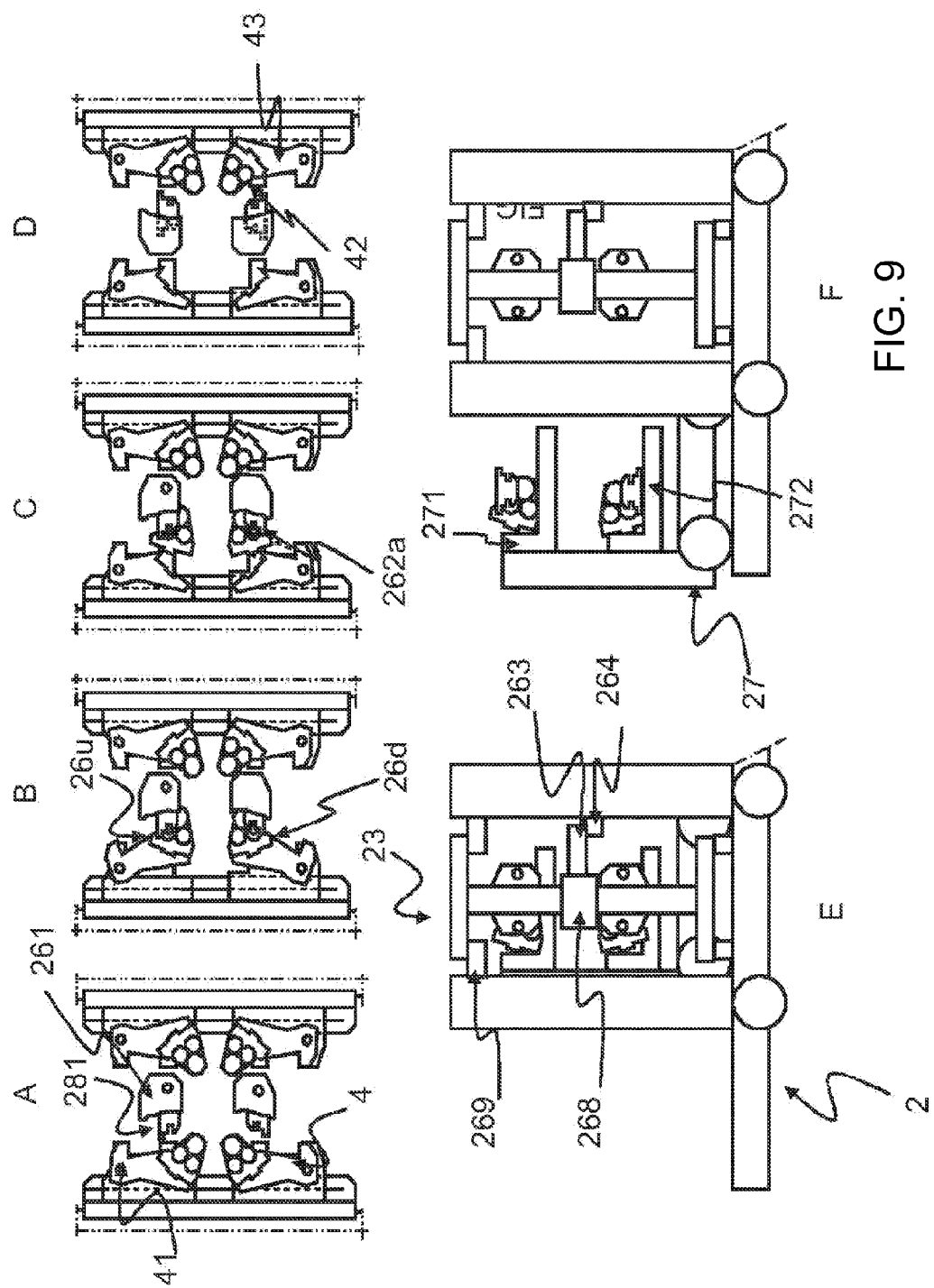
FIG. 9 example of steps which can be implemented by the disassembly equipment according to the invention and providing for the simultaneous change of two clusters or four lateral supporting cylinders.

FIG. 9 presents an example of steps which can be implemented by the disassembly equipment according to the invention and provide for a simultaneous change of two clusters or four lateral supporting cylinders by an extraction device equipped with said gripping tool, i.e. the supporting beam including at each of its ends said cradle according to the invention. The steps to be implemented in order simultaneously to change the four lateral supporting cylinders are exactly the same as those described for FIG. 7. For disassembly of a set of clusters, for example the simultaneous disassembly of an upper cluster 26u and a lower cluster 26d, the working and intermediate cylinders are first extracted from the stand and the lateral supporting members 4 pivoted about their respective axes of pivot 41 under the action of jacks (not represented) toward a distant position as represented in FIG. 9A, in order to free a passage in the axis of the stand (axis of travel of the strip) between said lateral supporting members 4 for the extraction device. The latter can then move in the direction of the roll stand between said lateral supporting members 4 from its parking position. It is positioned in said passage in the axis of the stand so as to allow the lateral supporting members 4 of the two clusters 26u, 26d concerned to pivot in close position by being inserted between the two gripping cradles 281 of the supporting beam situated, with its cradles 281, between the gripping plates 261 of the upper or respectively lower crossbeam. The gripping tool moves in particular with respect to the plates 261 along a direction parallel to the direction of travel of the strip to accept the pivoted upper 26u and lower 26d clusters. Each cluster locking bolt 262a intended to rigidly connect said pivoted cluster 26u, 26d to the extraction device is actuated in order rigidly to connect said cluster 26u, 26d to said extraction device, in particular the crossbeam of the upper cluster 26u to the gripping plates 261 equipping the upper crossbeam, and the transverse beam of the lower cluster 26d to the gripping plates 261 equipping the lower crossbeam. For this purpose, each cluster locking bolt 262a is capable of either being inserted into a cavity of the transverse beam of the cluster, or pressing one end of a trigger capable of functioning as a latch, said end being for example a rod capable of projecting outside said cavity, the rest of the body of said trigger being inside said cavity. The trigger thus includes in particular said rod and a spring device. Said trigger can thus be compressed into said cavity by said cluster locking bolt 262a during the rigid connection of the cluster to the gripping plates 261 and is capable of being released during a release of the pressure exerted by said cluster locking bolt 262a. When the trigger is released, the rod of the latter is capable of functioning as a latch by projecting longitudinally outside said cavity. Advantageously, said trigger rod provides in particular for rigid connection of the cluster to the gripping tool when the cluster locking bolts 262a release the pressure which each exerts against said rod of one of the triggers capable of equipping each cavity of each transverse cluster beam.

Preferentially, the compression of said trigger by said cluster locking bolt 262a is capable of disconnecting the transverse cluster beam 42 from its supporting arms 43 as indicated in FIG. 9B. In particular, said compression, respectively the release or slackening, of said trigger is capable of releasing, respectively actuating, a clamping system capable of disconnecting, respectively rigidly connecting, said transverse beam from or to its supporting arms 43. The latter, once disconnected from their respective transverse beams, are pivoted in distant position in order to allow the extraction device to be retracted in parking position in its shuttle compartment carrying the two clusters as indicated in FIGS. 9C and 9D.

FIG. 9E presents a bracket carriage 27 situated laterally with respect to the compartment 23 of the shuttle 2 and comprising an upper bracket 271 and a lower bracket 272. Said bracket carriage 27 can be engaged in the compartment 23 of the shuttle 2 by a movement parallel to the travel of the strip in order to accept respectively the upper cluster 26u and the lower cluster 26d, each being rigidly connected to its gripping tool disconnected from the extraction device. The bracket carriage 27 and its upper 271 and lower 272 brackets each supporting a cluster equipped with its gripping tool can then be extracted from the compartment 23 of the shuttle 2 by a lateral movement out of said compartment, as indicated in FIG. 9F. The extraction of the bracket carriage 27 out of said compartment 23 frees in particular the extraction device to accept new clusters in order to introduce them into the roll stand in place of those previously disassembled.

For this purpose, the extraction device is in particular capable of being positioned, by advancing toward the roll stand, in an intermediate position, opposite another bracket carriage identical to said bracket carriage 27, but including on each of its upper and lower brackets a new cluster rigidly connected to another gripping tool. The other bracket carriage can then be engaged in the compartment 23 of the shuttle 2 by a movement parallel to the travel of the strip in order to put the upper and lower clusters in a position providing for the acceptance of the gripping tools by the extraction device, in particular, a support of the supporting member of each cradle by said gripping plates 261.

The extraction device is then advanced in the axis of the roll stand, in the passage freed by pivoting the cluster supporting arms 43. Once in place in gripping position, the supporting arms 43 of each cluster intended to be assembled pivot in close position, being inserted between the two cradles 281 of the gripping tool, which are each in particular capable, by moving said gripping tool parallel to the plane of travel of the strip, in the direction of said supporting arms 43, of allowing said transverse beams 42 of said clusters intended to be assembled to dock with said supporting arms 43. The cluster locking bolts 262a are then actuated in order to provide for the disconnection of the cluster from the cradles 281 and its simultaneous rigid connection to its supporting arms 43 by means of the clamping system described previously. The two lateral supporting members 4 can then pivot in distant position in order to leave a free passage for the extraction device, which is retracted into parking position in the compartment 23 of the shuttle 2.

If it is necessary to change the four clusters, the steps described above with FIG. 9 for changing an upper cluster and a lower cluster are reproduced in total for another upper cluster and another lower cluster, after a movement of each gripping tool in the direction of said other clusters intended to be changed, as indicated in particular in FIG. 9D.

Figure 10:
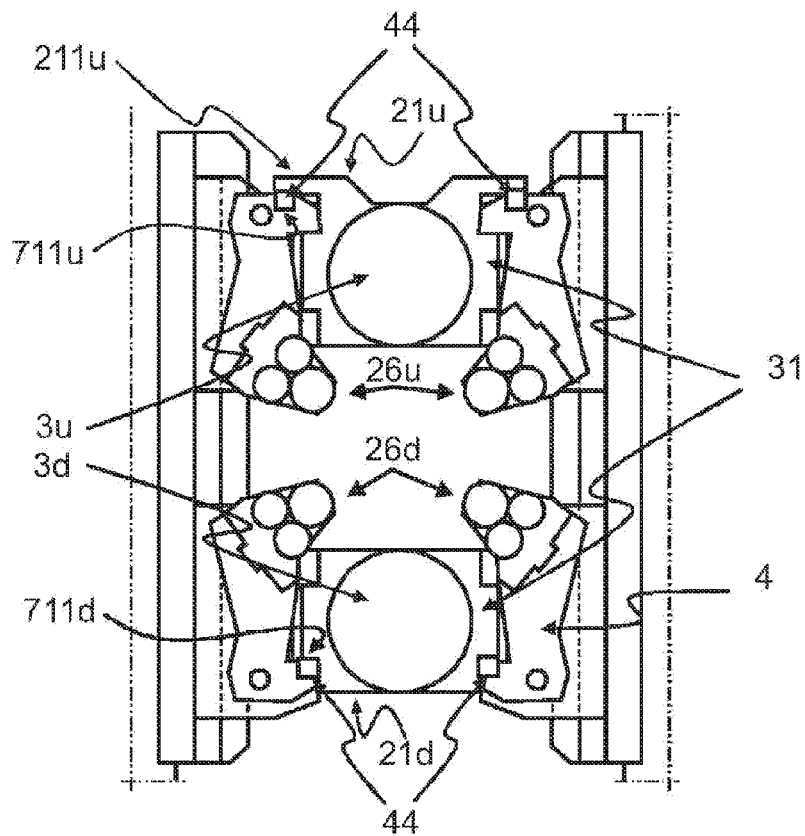
FIG. 10 exemplary embodiment of a roll stand suitable for the disassembly equipment according to the invention.

FIG. 10 presents a roll stand suitable for the disassembly equipment according to the invention and for which the lateral supporting members are in distant position and the working cylinders have been retracted. This roll stand is a 6-high roll stand which traditionally includes an upper working cylinder situated above a plane of travel of the strip to be rolled, and a lower working cylinder situated below said plane of travel of the strip to be rolled, an upper intermediate cylinder capable of being in contact with the upper working cylinder and a lower intermediate cylinder capable of being in contact with the lower working cylinder and an upper supporting cylinder capable of being in contact with the upper intermediate cylinder and a lower supporting cylinder capable of being in contact with the lower intermediate cylinder, the upper and lower supporting cylinders being capable of transmitting a gripping force to the working cylinders through the intermediate cylinders. According to the 6-high configuration, the roll stand suitable for the present invention includes at least one lateral supporting member capable of laterally supporting one of said working cylinders, in particular a first and a second upper lateral supporting member, situated respectively on each side of a plane of the strip gripped by the working cylinders and capable of laterally supporting said upper working cylinder, and a first and a second lower lateral supporting member, situated on each side of said gripping plane and capable of laterally supporting the lower working cylinder.

The roll stand suitable for the installation according to the invention is characterized in that each of the supporting arms of the upper clusters 26u is capable of including in particular a sliding or rolling surface 711u capable of cooperating with castors or slide runners (not represented) which can equip lugs 211u of the chocks 21u of the upper intermediate cylinder 3u. Thus, during disassembly, extraction of an upper intermediate cylinder 3u carried by its chocks 21u capable of moving axially by the sliding or rolling respectively of said runners or of said castors on said surfaces 711u can be implemented by axial movement of said chocks on the supporting arms of the upper clusters 26u of the lateral supporting members as far as the first bracket carriage of the disassembly equipment, outside the roll stand. In particular, disassembly rails 44 fixed in the roll stand to said lateral supporting members 4, can act as a sliding or rolling surface for the runners or castors of said chocks and are advantageously extendable by other rails assembled on the shuttle of the disassembly equipment according to the invention in order to provide for movement of the intermediate cylinders by sliding or rolling on said rails, during assembly or disassembly of said intermediate cylinders by said other extraction device. Similarly, each supporting arm of the lower clusters 26d is also capable of including a sliding or rolling surface enabling the chocks of the lower intermediate cylinder to move axially by sliding or rolling by means respectively of slide runners or castors which can equip surfaces 711d of said chocks of the lower intermediate cylinder, said slide runners or castors being intended to cooperate for example with rails 44 assembled on the supporting arms of the lower cluster 26d in order to provide for extraction or assembly of the lower intermediate cylinder 3d and its chocks 21d by means of the disassembly equipment according to the invention, said rails 44 being extendable by rails assembled in the shuttle of said disassembly equipment. Also, the roll stand suitable for the present disassembly equipment is also characterized in that each lateral supporting cylinder includes said lateral supporting cylinder locking system, and that its lateral supporting members include in particular said clamping system described in particular in FIG. 12.

Figure 11:
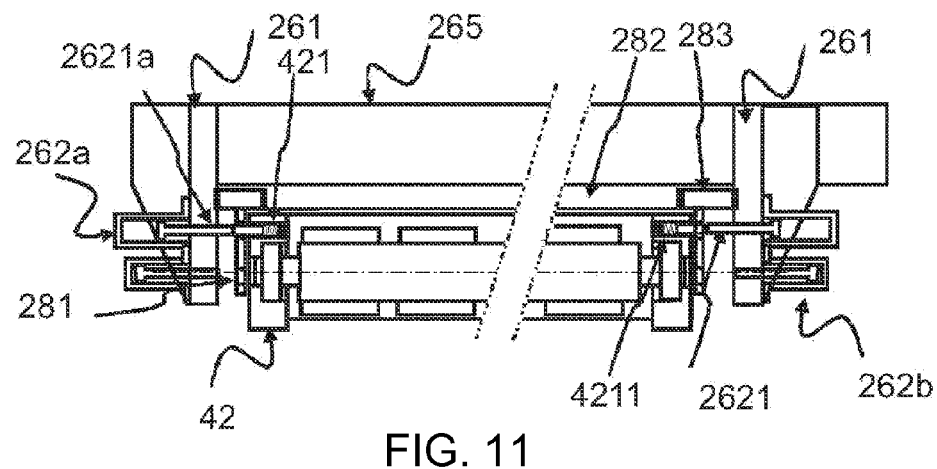
FIG. 11 exemplary embodiment of an extraction device according to the invention capable of being rigidly connected to a cluster.

FIG. 11 describes, as an example, an extraction device according to the invention. This extraction device includes in particular an upper crossbeam 265 equipped, at each of its ends, with a gripping plate 261, each gripping plate 261 including at least one cluster locking bolt 262a and at least one lateral supporting cylinder locking bolt 262b. The lower crossbeam of the extraction device is identical to said upper crossbeam 265, but is arranged symmetrically with respect to the plane of travel of the strip, below said upper crossbeam 265. The gripping plates 261 are in particular capable of being coupled to a cluster gripping tool including a first cradle 281 rigidly connected to a second cradle 283 by means of a supporting beam 282. Each locking bolt according to the invention, for example the cluster locking bolt 262a, or the lateral supporting cylinder locking bolt 262b, is a moving part which can be actuated, for example hydraulically, by an actuating device, such that one end of the cluster locking bolt 262a is capable of cooperating with a cavity 421 of the transverse beam of the cluster, and that one end of the lateral supporting cylinder locking bolt 262b is capable of actuating an axis locking device as described in FIG. 13. In particular, said cavity 421 includes a trigger 4211 one end of which is capable of projecting outside said cavity 421 and is intended to be pressed by said cluster locking bolt 262a. In particular, said trigger includes a spring and a rod, said rod forming said end intended to project outside said cavity. In particular, said rod of the trigger is intended to connect said cluster rigidly to a cradle 281, 283 of the gripping tool. To this effect, each gripping cradle of each gripping tool includes a first slot intended to enable the lateral supporting cylinder locking bolt 262b to pass through said cradle, and a second slot intended to accept the end of said rod of the trigger in order to connect said cluster rigidly to said cradle. Thus, during retraction of the cluster, the gripping tool, through a movement perpendicular to said upper crossbeam, parallel to the plane of travel of the strip, from an initial position to a distant position, is capable of inserting said rods of the triggers equipping each cavity of the transverse beam supporting the cluster in said second slot of each of its cradles, then said cluster locking bolts each simultaneously press one of said trigger rods in order to actuate the disconnection of the cluster from its supporting arms by means of the clamping system, said rod of the trigger being sufficiently long to remain in said second slot when it is pressed by said cluster locking bolt. During assembly of the cluster on its supporting arms, the cluster locking bolt actuates, in a first stage, the rod of the trigger, said actuation resulting in the rigid connection of the cluster to its supporting arms by said clamping means, then the cluster locking bolts release the pressure exerted on said trigger rods and the gripping tool moves from its distant position to its initial position, ready for the disassembly of another cluster.

Figure 12:
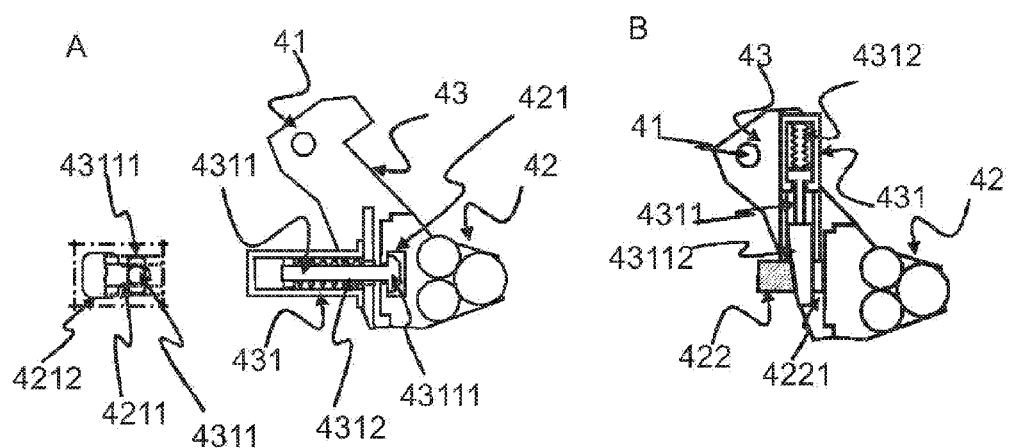
FIG. 12 exemplary embodiment of clamping members of a roll stand suitable for the disassembly equipment according to the invention.

FIG. 12 describes two examples of implementation of clamping members according to the invention which can equip said roll stand described in FIG. 10. These clamping members are capable of rigidly connecting/disconnecting the cluster 42 to or from its supporting arms 43.

FIG. 12A presents a first exemplary embodiment of said clamping member according to the invention, intended to equip each support arm of a cluster. The clamping member according to this first exemplary embodiment includes a jack 431 rigidly connected to the supporting arm 43 of the cluster 42 including a moving rod 4311 one T-shaped end of which 43111 is capable of being locked in a locking space 421 of the crossbeam of the cluster 42. This locking space 421 includes in particular a locking groove 4211 on the edges of which said T-shaped end 43111 is capable of resting in order to press said crossbeam against said supporting arm 43 in order to keep it rigidly connected to the latter. Said locking space 421 also includes a hollow 4212 forming, with said groove, an open space. Said hollow 4212 is capable of allowing said T-shaped end 43111 to pass out of the locking space 421. Elastic pressure members 4312 are also capable of exerting a locking pressure capable of keeping the supporting arm 43 and the crossbeam of the cluster 42 rigidly connected.

The disconnection of each of the supporting arms 43 of a cluster 42 from the transverse beam includes firstly an advance of the rod 4311 of the jack, said advance being in particular capable of being actuated or controlled by said control system, in order to release the pressure of the elastic pressure members 4312 on said transverse beam, then secondly, longitudinal sliding of the crossbeam of the cluster 42 in order to bring said T-shaped end 43111 into the hollow 4212. The transverse beam, accepted by the gripping plates of one of the crossbeams of the extraction device according to the invention, can then be separated from its supporting arms 43 by simple rotation of said arms about their respective axis of rotation 41.

FIG. 12B presents a second exemplary embodiment of said clamping member according to the invention, intended to equip each supporting arm of a cluster. The clamping member according to this second exemplary embodiment includes a jack 431 rigidly connected to the arm 43 including a moving rod 4311 one wedge-shaped end of which 43112 is capable of being locked in a slot 4221 of a locking piece 422 rigidly connected to the transverse beam of the cluster 42. Elastic pressure members 4312 are capable of exerting a locking pressure capable of keeping the supporting arms 43 and the transverse beam 42 rigidly connected.

The disconnection of each of the supporting arms 43 from the transverse beam of the cluster 42 to which they are rigidly connected includes a backward movement of the rod 4311 of said jack 431 capable of releasing the locking pressure exerted by the elastic pressure members 4312 and capable of extracting the wedge-shaped end 43112 from the locking piece 422. Said backward movement is in particular capable of being controlled or actuated by said control system. The transverse beam of the cluster 42, accepted by the gripping plates of one of the crossbeams of the extraction device according to the invention, can then be detached from its supporting arms 43 by simple rotation of each of said supporting arms about their respective axis of rotation 41.

According to the present invention, each locking bolt carried by the gripping plate, whether a cluster locking bolt or a lateral supporting cylinder locking bolt, can be actuated or is capable of being controlled by a locking bolt actuation device which can be rigidly connected to said plate. Said actuation device of said locking bolt is in particular capable of moving said locking bolt from a locked position to an unlocked position, and vice versa. An example of a locking bolt actuation device is a jack capable of being fixed to said gripping plate and including a rod one freely moving end of which includes said locking bolt or acts as a locking bolt. The jack is capable of moving its mobile rod, and thus said locking bolt, from said locked position making it possible for example to lock a cluster or a lateral supporting cylinder to said plate, to said unlocked position making it possible to release said cluster or said lateral supporting cylinder from being locked with said locking bolt.

Figure 13:
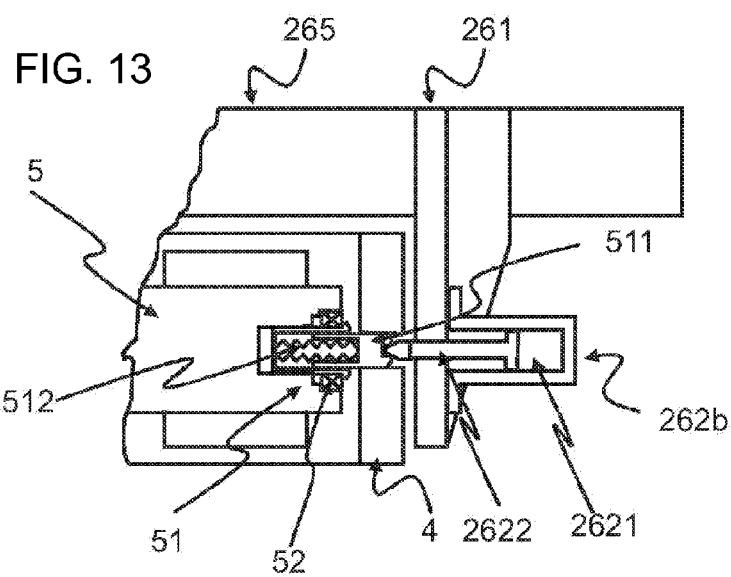
FIG. 13 exemplary embodiment of a device for actuating a locking bolt according to the invention.

In particular, FIG. 13 describes an exemplary embodiment of the locking bolt actuation device capable of actuating or controlling a lateral supporting cylinder locking bolt 262b of a lateral supporting cylinder 5. A gripping plate 261 is fixed to one of the ends of an upper crossbeam 265, represented partially in the figure. The actuation device is for example a piston 2621 capable of transmitting a movement to a moving part 2622, for example a rod, capable of acting as a locking bolt 262b. The end of said locking bolt 262b is capable of being locked on one end of an axis of rotation 51 fixed in rotation with respect to a part 4 of the cluster, and on which the lateral supporting cylinder 5 can turn by means of a bearing 52. The axis of rotation 51 includes a locking system including an axis locking device 511 which can be kept in locked position by an elastic pressure member 512. An advance of the rod 2621 of the jack 262 makes it possible to release a pressure capable of being exerted by the elastic pressure member 512 to keep the axis locking device 511 in locked position (i.e. lateral supporting cylinder locked to the part 4 of the cluster) and to extract the axis locking device 511 from the part 4 of the cluster. Clearly, the part 4 of the cluster provides, during pivoting of the supporting arms of the cluster, for free pivoting of the cluster with respect to its lateral supporting cylinder when the latter is rigidly connected to the gripping plates by means of said lateral supporting cylinder locking bolts. In fact, the cluster according to the invention is characterized by a constructional arrangement capable of allowing for the pivoting of the cluster separated from its lateral supporting cylinder when the latter is accepted by the extraction device. This constructional arrangement is for example a slot of each of the parts 4 of the cluster intended to connect the lateral supporting cylinder rigidly to said cluster, said slot providing for free passage out of said slot of each lateral supporting cylinder locking bolt locked on said lateral supporting cylinder, during pivoting of the supporting arms of the cluster. The lateral supporting cylinder 5, once accepted by the extraction device, can thus be detached from its cluster by simple pivoting of the supporting arms of said cluster, the rod 2621 passing for example into the slot made in the part 4 of the cluster, said slot being for example visible in FIG. 7C. The trigger described previously and the axis locking device 511 can in particular function in a similar way.

Thus, each locking bolt can be actuated by such an actuation device and the set of actuation devices each controlling a cluster or lateral supporting cylinder locking bolt can itself be controlled in a centralized manner by a central control device. In a particular embodiment, the latter is also capable of controlling the clamping members, the control systems, the moving member of the extraction device and of said other extraction device, as well as the carriages, the shuttle, the handling frame, said extraction device, and finally the or said other extraction devices in order to allow for automation of the change of at least one cylinder and/or at least one cluster of the roll stand.

To summarize, the disassembly equipment and the method for changing cylinders and/or clusters of a roll stand according to the invention present several advantages with respect to the existing equipment and methods in that:
- they make it possible to limit the down time of the rolling mill during changes of cylinders/clusters of a roll stand;
- they allow selective change of cylinders/clusters;
- they make it possible to change cylinders/clusters of a roll stand the lateral supporting members of which pivot about axes of pivot rigidly connected to camber units of the intermediate cylinders;
- they allow for simpler and quicker assembly of intermediate cylinders, in particular by freeing the latter from the restricting use of bearings intended to provide for axial movement of their pins, given that the lateral supporting members have pivot points rigidly connected to the camber units, said pivot points providing for pivoting of the supporting arms of the clusters.

The invention claimed is:

1. A disassembly apparatus for changing cylinders and/or clusters of a roll stand for rolling a metal strip, the disassembly equipment being capable of changing at least one cylinder and/or at least one cluster of the roll stand, the disassembly equipment comprising:
   a handling frame including positioning and moving means for moving and positioning the handling frame along at least one first direction defined relative to the roll stand;
   a mobile shuttle configured for moving over said frame along a second direction perpendicular to said first direction, said shuttle including an extraction device capable of disassembling the roll stand or of assembling the at least one cluster and/or the cylinder on the roll stand;

said extraction device including:
- an upper crossbeam rigidly connected, via a connecting strut, to a lower crossbeam disposed below said upper crossbeam, each of said upper and lower crossbeams including, at each end thereof, a gripping plate having at least one locking bolt, wherein said gripping plates of a single crossbeam are configured to grip at least one cluster and/or at least one lateral supporting cylinder by actuating said locking bolt; and
- a moving member configured for moving said extraction device along said first direction by acting on said connecting strut of said upper and lower crossbeams.

2. The disassembly apparatus according to claim 1, wherein said extraction device includes a gripping plate moving device configured for moving at least one of said gripping plates.

3. The disassembly apparatus according to claim 1, wherein each plate includes two lateral supporting cylinder locking bolts and two cluster locking bolts, intended respectively for locking and unlocking at least one lateral supporting cylinder, and for locking and unlocking at least one cluster.

4. The disassembly apparatus according to claim 3, wherein at least one of said lateral supporting cylinder locking bolts is configured for actuating a locking system of said lateral supporting cylinder capable of rigidly connecting or disconnecting said lateral supporting cylinder to or from the cluster.

5. The disassembly apparatus according to claim 3, wherein at least one of said cluster locking bolts is configured for actuating a clamping system of the cluster capable of rigidly connecting the cluster to its supporting arms or of disconnecting the cluster from the supporting arms.

6. The disassembly apparatus according to claim 1, wherein at least one gripping plate of a crossbeam is configured to cooperate with a mobile cluster gripping cradle that can be positioned between the plate and the other plate fitted to the same crossbeam, said cradle including at least one supporting member providing for support of said cradle by said gripping plate.

7. The disassembly apparatus according to claim 1, wherein each of said upper crossbeam and said lower crossbeam includes a guidance device configured for guiding the respective said crossbeam over an extendable rail in the roll stand.

8. The disassembly apparatus according to claim 1, wherein said shuttle is formed with a compartment and said extraction device can be housed in said compartment suitable for changing at least one cluster and/or at least one lateral supporting cylinder of said roll stand by way of said extraction device, said compartment being capable of being supplied by at least one moving bracket carriage comprising an upper bracket and a lower bracket each intended to act as a support for at least one cluster or at least one lateral supporting cylinder.

9. The disassembly apparatus according to claim 8, wherein said shuttle includes at least one other compartment arranged laterally, along said second direction, alongside said compartment capable of being supplied by said bracket carriage, and including another extraction device capable of changing a working cylinder and/or an intermediate cylinder, and having the following features:

- an extended body capable of being arranged in length, substantially horizontally, along said first direction in said other compartment;
- at one end of said extended body and fixed to said extended body, a gripping member of a working cylinder including two fixed jaws each capable of grasping a pin of a working cylinder,
- in said extended body and able to be removed therefrom, two bolts each able to be actuated by a jack, and capable of each being locked on a chock of the intermediate cylinder or on a member attached to said chock,
- a moving member of said extended body capable of moving said extended body along said first direction.

* * * * *